(12) United States Patent
Schell et al.

(10) Patent No.: US 6,615,350 B1
(45) Date of Patent: Sep. 2, 2003

(54) MODULE AUTHENTICATION AND BINDING LIBRARY EXTENSIONS

(75) Inventors: Roger R. Schell, Orem, UT (US); Robert R. Jueneman, Provo, UT (US); Mark G. Gayman, Orem, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/274,971

(22) Filed: Mar. 23, 1999

Related U.S. Application Data

(60) Provisional application No. 60/079,133, filed on Mar. 23, 1998.

(51) Int. Cl.[7] .................... G06F 12/14; G06F 11/28; H02L 9/32
(52) U.S. Cl. ............... 713/168; 713/169; 713/170; 713/171; 713/187; 713/200; 380/23; 380/30; 705/57
(58) Field of Search ................ 713/168, 169, 713/170, 171–187, 193, 200; 380/30, 23; 705/57

(56) References Cited

U.S. PATENT DOCUMENTS

| | | | |
|---|---|---|---|
| 4,870,681 A | 9/1989 | Sedlak | 380/30 |
| 4,918,728 A | 4/1990 | Matyas et al. | 380/21 |
| 4,937,863 A | 6/1990 | Robert et al. | 380/4 |
| 5,007,089 A | 4/1991 | Matyas et al. | 380/49 |
| 5,142,578 A | 8/1992 | Matyas et al. | 380/21 |
| 5,164,988 A | 11/1992 | Matyas et al. | 380/25 |
| 5,200,999 A | 4/1993 | Matyas et al. | 380/25 |
| 5,201,000 A | 4/1993 | Matyas et al. | 380/30 |
| 5,249,230 A | 9/1993 | Mihm, Jr. | 380/23 |
| 5,265,164 A | 11/1993 | Matyas et al. | 380/30 |
| 5,280,529 A | 1/1994 | Nøst | 380/49 |
| 5,299,263 A | 3/1994 | Beller et al. | 380/30 |

(List continued on next page.)

OTHER PUBLICATIONS

Software Product protection, Min Chen, Telecommunication Software and Multimedia ISSN 1455–9749, Article in T–110.501 Seminar on Network Security, 2001ISBN 951–22–5807–2.*

Trusting DRMSoftware, Cheng et al., W3C workshop on DRM, Jan. 2001.*

Hardware Contention Serialization Algorithm, IBM Technical Disclosure Bulletin, vol. 38, Isue No. 4, Apr. 1995, pp. 73–78.*

(List continued on next page.)

*Primary Examiner*—Gail Hayes
*Assistant Examiner*—Taghi T. Arani
(74) *Attorney, Agent, or Firm*—Schwegman, Lundberg, Woessner & Kluth, P.A.

(57) ABSTRACT

An apparatus, system, and method to provide an initial and an on-going authentication mechanism with which two executable entities may unilaterally or bilaterally authenticate the identity, origin, and integrity of each other. In one instance, the authentication mechanisms are implemented within a dynamically loaded, modular, cryptographic system. The initial authentication mechanism may include digitally signed challenge and possibly encrypted response constructs that are alternately passed between the authenticating and authenticated executable entities. A chain of certificates signed and verified with the use of asymmetric key pairs may also be part of the initial authentication mechanism. Representative asymmetric key pairs include a run-time key pair, a per-instance key pair, and a certifying authority master key pair. The on-going authentication mechanism may include a nonce variable having a state associated therewith. The state may be both time and incidence varying and may be combined in an obfuscating or encrypted manner into data passed between the executable entities. The initial and ongoing authentication mechanisms may have instances implemented without the use of export-regulated cryptography.

20 Claims, 12 Drawing Sheets

U.S. PATENT DOCUMENTS

| | | | |
|---|---|---|---|
| 5,337,360 A | | 8/1994 | Fischer .......................... 380/23 |
| 5,386,471 A | | 1/1995 | Bianco .......................... 380/49 |
| 5,390,247 A | | 2/1995 | Fischer .......................... 380/25 |
| 5,406,628 A | | 4/1995 | Beller et al. ................... 380/30 |
| 5,412,717 A | | 5/1995 | Fischer ........................... 380/4 |
| 5,432,849 A | | 7/1995 | Johnson et al. ............... 380/21 |
| 5,495,533 A | | 2/1996 | Linehan et al. ............... 380/21 |
| 5,689,565 A | | 11/1997 | Spies et al. .................... 380/25 |
| 5,721,777 A | | 2/1998 | Blaze ............................. 380/4 |
| 5,933,503 A | | 8/1999 | Schell et al. ................... 380/25 |
| 5,935,246 A | * | 8/1999 | Benson ....................... 713/200 |
| 5,970,145 A | * | 10/1999 | McManis ...................... 380/23 |
| 6,173,404 B1 | * | 1/2001 | Colburn et al. ............. 713/200 |
| 6,330,586 B1 | | 12/2001 | Yates et al. .................. 709/201 |
| 6,335,972 B1 | | 1/2002 | Chandersekaran et al. ... 380/286 |
| 2002/0073316 A1 | * | 6/2002 | Collins et al. .............. 713/174 |

OTHER PUBLICATIONS

"Microsoft Computer Dictionary", *5th Edition*, (2002),484.

"Mechanics of the Common Security Services Manager (CSSM)", Rajan and Wood, Intel Corporation 1999, pp. 1–17.

"Making PC Interaction Trustworthy for Communications, Commerce and Content", Intel Security Program, Jul. 1998, pp. 1–6.

"Security Prevails in e–mail coding", pp. 1–2.

"Secure Way Cryptographic Infrastructure", IBM 1996, pp. 1–3.

"Supporting Services and Sub–Systems", IBM 1996, pp. 1–4.

"APIs and Toolkits", IBM 1996, pp. 1–2.

"Cryptographic Engines", IBM 1996, pp. 1–2.

"The IBM Secure Way Cryptographic Infrastructure", IBM 1996, pp. 1–2.

"Applications", IBM 1996, pp. 1–2.

"Conclusion", IBM 1996, pp. 1–3.

"High–Tech Leader Join Forces to Enable International Strong Encryption", IBM 1996, pp. 1–3.

"Gore to Unveil Encryption Policy", The Net 1996, pp. 1–2.

"White House Encryption Initiative–2: IBM, Digital Support", Dow Jones International News, Oct. 01, 1996, pp. 1–3.

"IBM (International Business Machines Corp) to Form Consotium for Data Encryption", Yahoo, Oct. 01, 1996, pp. 1–2.

"Method for Ensuring Integrity of Public Key Algorithm Public and Private Keys and for Coupling the usage of a Key to the Correct Specification of the Key's Associated Control Vector", SPI Database of Software Technologies, Jun. 1994, 1 page.

"Solaris Manpage for Intro(1M)(maintenance Commands)", SPI Database of Software Technologies, 1993, pp. 4–7.

"SunOS Manpage for INTRO(4)", SPI Database of Software Technologies, Apr. 29, 1992, pp. 14–15.

"SunOS Manpage for INTRO(8)", SPI Database of Software Technologies, May 22, 1991, pp. 7–11.

Two–Level Data Security System for an IBM Personal Computer; SPI Database of Software Technologies, Mar. 1987, pp. 11–12.

"Statement of the Vice President", The White House, Oct. 01, 1996, pp. 1–3.

* cited by examiner

MODULE AUTHENTICATION AND BINDING LIBRARY EXTENSIONS

RELATED INVENTIONS

This application is a Continuation-In-Part of and claims priority to U.S. Provisional Patent Application Ser. No. 60/079,133, filed on Mar. 23, 1998.

BACKGROUND OF THE INVENTION

1. The Field of the Invention

The present invention relates to novel systems and methods for authenticating independent, executable software entities operating within a computer system. More particularly, the present invention relates to the use of modular components for inclusion within independent, executable entities to dynamically authenticate the independent, executable entities to each other.

2. The Relevant Technology

Encryption Generally

Encryption is a technology dating from ancient times. In modern times, encryption of military communications has been common. However, since the famous "ENIGMA" machine of World War II, cryptography has been used in numerous functions. One of those functions is special purpose software or applications that may be hosted on computers. Hiding underlying algorithms, limiting access, inhibiting reverse engineering, limiting unauthorized use, controlling licensor, and the like may be legitimate uses of cryptography.

Cryptographic Processes

Modem cryptography protects data transmitted over high-speed electronic lines or stored in computer systems. There are two principal objectives: secrecy, to prevent the unauthorized disclosure of data, and integrity (or authenticity), to prevent the unauthorized modification of data. The process of disguising plaintext data in such a way as to hide its substance is encryption, and the encrypted result is cyphertext. The process of turning cyphertext back into plaintext is decryption.

A cryptographic algorithm, also called a cipher, is the computational function used to perform encryption and/or decryption. Both encryption and decryption are controlled by a cryptographic key or keys. In modern cryptography, all of the security of cryptographic algorithms is based in the key or keys and does not primarily depend on keeping any details of the algorithms secret.

There are two general types of key-based cryptographic algorithms: symmetric and public-key. Symmetric algorithms (also called secret-key algorithms) are algorithms where the encryption key can be calculated from the decryption key and vice versa (and in fact these keys are usually the same). These require that a sender and receiver agree on these keys before they can protect their communications using encryption. The security of these algorithms rests in the key, and divulging the key allows anyone to encrypt and decrypt data or messages with it.

In public-key algorithms (also called asymmetric algorithms), the keys used for encryption and decryption differ from each other in such a way that at least one key is computationally infeasible to determine from the other. To ensure secrecy of data or communications, only the encryption key need be kept private, and the encryption key can thus be made public without danger of encrypted data being decipherable by anyone other than the holder of the private decryption key. Conversely, to ensure integrity of data or communications, only the encryption key need be kept private, and a holder of a publicly-exposed decryption key can be assured that any ciphertext that decrypts into meaningful plaintext using this key could only have been encrypted by the holder of the corresponding private key, thus precluding any tampering or corruption of the ciphertext after its encryption.

Most public-key cryptographic algorithms can be used to provide only one of secrecy or integrity but not the other; some algorithms can provide either one but not both. The RSA (Rivest, Shamir, and Adleman) public-key algorithm (U.S. Pat. No. 4,405,829), however, whose security is based on the difficulty of factoring large numbers, has been effective in providing both secrecy and integrity.

A private key and a public key may be thought of as functionally reciprocal. Thus, whatever a possessor of one key of a key pair can do, a possessor of the other key of the key pair can undo. The result is that pairwise, secret, protected communication may be available without an exchange of keys. Thus, in general, a receiver, in possession of its own private key may decrypt messages targeted to the receiver and encrypted by the sender using the receiver's public key. A receiver may authenticate a message, using its own copy of a sender's public key, to decrypt data (e.g., a signature) encrypted with a sender's private key corresponding to the sender's public key.

An asymmetric algorithm assumes that public keys are well publicized in an integrity-secure manner. A sender (user of a public key associated with a receiver) can then know that the public key is valid, effective, and untampered with. One way to ensure integrity of data packets is to run data through a cryptographic algorithm. A cryptographic hash algorithm may encrypt and compress selected data. Such hash algorithms are commercially available. For example, the message digest 5 (MD 5), and the message digest 4 (MD 4) are commercially available software packages or applications for such functions.

A certificate may be thought of as a data structure containing information or data representing information, associated with assurance of integrity and/or privacy of encrypted data. A certificate binds an identity of a holder to a public key of that holder, and may be signed by a certifying authority. A signature is sometimes spoken of as binding an identity of a holder to a public key in a certificate. As a practical matter, a certificate may be very valuable in determining some level of confidence in keys associated with encryption. That is, just how "good" is an encryption in terms of privacy and integrity? That confidence level may be established by means of a certificate hierarchy. By certificate hierarchy is meant a certification process or series of processes for providing certificates from a trusted authority to another creator of keys.

A certificate, being a data structure, may contain, for example, data regarding the identity of the entity being certified as the holder of the key associated with the certificate, the key held (typically it is a public key), the identity (typically self-authenticating) of the certifying authority issuing the certificate to the holder, and a digital signature, protecting the integrity of the contents of the certificate. A digital signature may typically be based on the private key of the certifying authority issuing the certificate to the holder. Thus, any entity to whom the certificate is asserted may verify the signature corresponding to the private key of the certifying authority.

In general, a signature of a certifying authority is a digital signature. The digital signature associated with a certificate enables a holder of the certificate, and one to whom the certificate is asserted as authority of the holder, to use the signature of the certifying authority to verify that the contents of the certificate have not been modified. Such verification assures the integrity and authenticity of the certificate and of the public key in the certificate. This verification is accomplished using the certifying authority's public key.

Cryptographic Policies

Government authorities throughout the world have interests in controlling the use of cryptographic algorithms and keys. Many nations have specific policies directed to creation, use, import, and export of cryptographic devices and software. Numerous policies may exist within a single government. Moreover, these policies are undergoing constant change periodically.

Cryptographic policies may limit markets. For example, a cryptographic algorithm may not be included in software shipped to a country having laws restricting its importation. On the other hand, such a cryptographic device may be desired, highly marketable, and demanded by the market in another country. Thus, generalized software development, standardization of software, and the like may become difficult for software vendors. Moreover, users have difficulties attendant with supporting limited installed bases of specialized software. That is, a sufficient installed base is required to assure adequate software.

In short, cryptographic use policies sometimes constrain the set of cryptographic algorithms that may be used in a software system. In addition to restrictions on allowable algorithms, cryptographic use policies may also place constraints on the use and strength of keys associated with those algorithms. Software shipped or used in any country must be in compliance with the extant policies.

Another common aspect of certain cryptographic use policies is a requirement that a copy of cryptographic keys be stored or "escrowed" with an appropriate authority. However, the mechanisms necessary to satisfy different policies can vary greatly.

Cryptography, especially public key cryptography, provides certain benefits to software designers. U.S. Pat. No. 4,200,700, U.S. Pat. No. 4,218,582, and U.S. Pat. No. 4,405,829 are directed to such technology and are incorporated herein by reference. These benefits are available in situations where data may be shared. Many modern software packages (applications, operating systems, executables) are used in businesses or in other networks where multiple "clients" may share a network, data, applications, and the like. Most modem software packages employ cryptography in some form.

One application for cryptography in network management or network operating systems includes authentication. Also, integrity of data packets transferred, encryption of files, encoding associated with licenses for software or servers, and license distribution or serving are some of the applications for cryptography.

Users may be identified and their rights to access may be authenticated by means of passwords on a network. Cryptography is typically used to transfer some authentication, integrity, verification, or the like in a secure manner across a network that may be open to channel tapping. Public key cryptography is typically used in such a circumstance. Another application of cryptography for authentication involves a single sign-on. For example, a user may need to enter a single password at the beginning of a session. This may remain true regardless of the number of servers that may eventually be called into service by the individual user (client) during this single session. Historically, scripts have been used to provide a single sign-on, but public key mechanisms are now being provided for this function.

Users have previously demonstrated that networks may be subject to attack by spoofing of network control packets. This procedure may be demonstrated in playback and in man-in-the-middle scenarios. By such spoofing, users may obtain unauthorized privileges on a network server. Adding packet signatures, keyed on a per-session basis may provide improved packet integrity.

File encryption is becoming more available. Such encryption has particular use in the special circumstance of audit files. For example, a need exists to protect an audit trail from inspection or modification, or both, by a system administrator, even though the audit trail remains under the system administrator's physical control.

Certain licensing schemes may use various encryption modes to protect software against piracy by end users and others throughout a distribution chain. Data structures, cryptography methodologies, checks, and other protection mechanisms may be proprietary to a software developer. Nevertheless, license server mechanisms are being developed to support control of the use of application software in conformity with licenses. Licenses may be provided by an application software provider. The license server may use public key cryptography to create and verify signed data structures. Secret key cryptography may be used to support authentication and file encryption.

Certain applications may provide file confidentiality using proprietary, exportable, secret key algorithms. Users in large numbers make use of such algorithms. Nevertheless, considerable interest in breaking such proprietary algorithms has been successful with certain software. Proprietary encryption methodologies have been consistently broken, given enough time and attention by interested hackers.

Certain applications use public key cryptography for digital signatures. Market leaders in software have provided relatively weak secret key algorithms adopted by others. Thus, files written in different applications from different vendors, even encrypted files, may be opened by an application from any of the vendors using the market leader's secret key algorithm. Within a single product line, a vendor of software applications may use multiple algorithms. Several, if not a plethora of, algorithms exist, including both secret key algorithms and public key algorithms. Stream and block ciphers, as well as hash functions are available and well documented in the computer programming art. Also, certain algorithms are the subject of patent applications which may cloud their broadly based use.

What is needed is a standardized cryptography methodology for distribution across entire product lines. Moreover, encryption technologies are needed for permitting a licensee of a principal software manufacturer to become a third party vendor or value-added distributor capable of producing its own proprietary software, software additions, or pre-planned software modules. Currently, software-with-a-hole may provide an operating system with a cryptographic module that fits in the "hole" in an operating system. However, software manufacturers using this technology typically require that a third-party vendor send its product to the principal software manufacturer for integration. The manufacturer may then provide all interfacing and wrapping of the third-party's filler (such as an encryption engine) to fit within the "hole" in the software of the manufacturer.

Also, export restrictions exist for encryption technology. Limiting the strength of exported cryptography is established by statute. To be exportable, such products must meet certain criteria (primarily limitations on key size) that effectively prevent the exportation of strong cryptographic mechanisms usable for data confidentiality. Moreover, creating "cryptography with a hole" is undesirable for several reasons, including export and import restrictions. Cryptography with a hole is the presence of components specifically designed or modified to allow introduction of arbitrary cryptographic mechanisms by end users. A great escalation of the difficulty of such introduction, without creating numerous, individually customized software packages, is a major need today, although not necessarily well-recognized.

Certain foreign countries have more stringent regulation of the importation of encryption technology by non-government entities. A government may require that any imported encryption technology be subject to certain governmental policies as well as key escrow by some governmental agency. Key escrow systems may be easily provided in software, but integrity and assurance remain difficult. Using only software, reliable key escrow may be impossible, in the absence of very high assurance. For example, Class B3 or A1 may be required of a "trusted computing base" in order to protect keys against disclosure or modification. Likewise, protection of algorithms against disclosure or modification, and escrow against bypass, are also often required. Under any circumstances, software offers few protections when compared with hardware solutions.

Customers, whether third-party vendors, distributors, or end users, need information security. International commercial markets need products that may be marketed internationally without a host of special revisions that must be tracked, updated, and maintained with forward and backward compatibility as to upgrades and the like. Meanwhile, such solutions as key escrow do not receive ready customer acceptance in U.S. markets, particularly where a government is an escrow agent.

Flexibility of encryption technologies is also important, particularly to software development. For instance, it is important that standards or properties be created for managing access to encryption technologies. At the same time, it is likely that the properties will change over time, and the properties should be easily modified. The properties should also be securely contained with specific applications implementing the encryption technologies.

Dynamic Authentication of Independent, Executable Entities

Personal computers, including laptops, workstations and other more powerful computers, are increasingly linked through communications networks, the span and scope of which are increasing daily. Whereas once computers were only accessed and used within the secure confines of glass-enclosed computer rooms, today they are often accessed remotely, even from the other side of the world. Likewise, although in the past company-owned communications facilities, dedicated private networks, and/or value-added Networks provided a certain amount of control over who could connect to them, today public facilities such as the Internet are very widely used to provide ubiquitous interconnection.

But with the new ubiquitous communications paradigm comes an almost equally ubiquitous concern about the privacy, security, and integrity of the data that is being transmitted and received. In addition to eavesdroppers potentially gaining access to proprietary or personal information, we also have to worry about virus and Trojan Horse programs maliciously modifying data, allowing unauthorized users to access sensitive control functions, or even destroying massive amounts of data and thereby threatening the very survival of the organization, including our sensitive public infrastructure.

Thus, it becomes of concern in systems in which independent entities share resources and otherwise intercommunicate, that the independent entities may never be sure about the origin or integrity of the other entities with which they are communicating. This concern is particularly acute with respect to underlying base applications such as entities that are the providers of an underlying operating system or infrastructure.

There are a number of reasons why it would be desirable for an application to authenticate a base entity. One reason is just for the sake of assuring the correct functioning of the application. For example, mission-critical software applications are written independently of the operation systems used to support them, yet the developers of such need to verify that the operating system has not been modified in order to assure the correct functionality of the application.

Another potential application for authentication of a base entity by an application is in the area of software licensing. Applications may be sold under the condition that a single copy of the application be run on only one particular platform, and not multiple platforms or on network servers. In order to enforce this provision, the application needs to be able to authenticate the particular version of the operating system it is running on.

The most generally applicable solution to this entire broad class of problems is the use of cryptography, which can prevent anyone not in possession of both the cryptographic algorithm and the necessary cryptographic key from being able to read anything but gibberish from the communications, and in the case of cryptographic algorithms used to provide digital signatures and authentication, from being able to modify or delete the information without detection.

Nevertheless, the use of cryptography has its darker side. Traditionally because of its association with the military and the diplomatic corps, the use of cryptography has long been regarded as the exclusive province of governments, and some countries have even prohibited its use without specific permission.

In addition, the use of cryptography by criminal elements has always been a potential threat, and the recent increase in and/or sensitivity to drug related crimes, money laundering, and the potential use by terrorist organizations has significantly increased the concern within various governments as to the possibility of misuse of cryptography.

During the Cold War period, the export of cryptography from the United States was a primary concern, as the U.S. did not want our adversaries to gain access to effective cryptography which our intelligence agencies could not break. The export of cryptographic products, including the technical data describing them, was forbidden under the International Traffic in Arms Regulations, except under licence from the U.S. Department of State. The use of cryptography by U.S. citizens within the United States (or by the Canadians, who implemented an export regime which was the virtual duplicate of that administered by the U.S.) was not considered a significant concern, however.

Unlike other countries with a tradition of an Official Secrets act, such as the UK, or a somewhat more repressive "only that which is explicitly allowed is not forbidden" policy, the U.S. does not have any legal barriers which would prevent its citizens from making use of whatever kind of cryptography they would like to use. However, the use of unbreakable encryption mechanisms causes considerable anxiety within some of the law enforcement agencies, for they fear that their ability to investigate and prosecute criminals and terrorists, both inside and outside of our borders, may be severely hampered by the unfettered use of encryption by the general populous, including the criminal and terrorist elements.

Because of the importance of cryptography in protecting our business assets and enabling electronic commerce, the law enforcement agencies are not necessarily opposed to the use of cryptograph per se, but they do seek ways of controlling its use and/or providing mechanisms which would allow authorized access to the secret encryption keys, including covert and near-real-time access to such keys in order to facilitate investigations.

Because Congress has so far not seen fit to pass legislation which would either directly control the uses of encryption within the U.S., or would officially grant the law enforcement agencies the right to access the encryption keys that are used, the Administration has reportedly decided to use the existing export regulations to put pressure on hardware and software vendors who would like to export their products worldwide, in particular requiring them to include so-called key escrow, or key recovery mechanisms in their products in order to obtain an export license for anything better than weak (e.g., 56-bit) encryption.

However, one of the technical concerns that the export authorities have in this regard is the possibility that users of export-controlled software (including software which invokes export-controlled software or hardware) should not be able to defeat the key recovery and other controls by substituting other, non-controlled software which would provide the same functionality but with stronger cryptography and/or without key recovery. Although the specific cryptographic algorithms are widely published and readily available, the infrastructure necessary to actually use those cryptographic algorithms, including the integration into commercial software, is not nearly so easy accessed. This concern is frequently referred to as the "Crypto-with-A-Hole" problem.

Applications which directly include cryptographic functionality within their executable (binary) modules generally do not evince this level of concern, because the modules are statically bound together, and replacing the cryptographic functionality with something else would typically require a substantial amount of reverse engineering. However, directly incorporating the necessary cryptographic functionality into every application is very wasteful of the engineering talent required to write such systems, and leads to substantially greater software maintenance costs as well, in addition to being wasteful of the excess storage required. Instead, it would be highly desirable if a general purpose cryptographic infrastructure could be deployed which could be called by whatever applications required the functionality. The cryptography would therefore be integrated into the operating system, or provided as a common adjunct to the operating system which other programs could use.

Not only would this greatly simplify the development of such applications, but if it could be demonstrated that the applications only made use of those cryptographic functions and keys which were considered relatively safe or benign (e.g., digital signatures and keys used for authentication or nonrepudiation, as opposed to encryption without key recovery), then export would likely be possible and an expedited export review process might be possible, resulting in a significantly decreased time to market for application developers, and reduced legal expenses as well.

However, the key to the development of a common cryptographic infrastructure is the use of dynamic linking mechanisms which are resolved by the loader, or at run-time (by name), rather than using static linkages. And unfortunately, the use of such dynamic linkage mechanisms (e.g., the Dynamic Link Library or DLL calls typically used in many operating systems) would vastly simplify the substitution of one kind of an uncontrolled cryptographic infrastructure in place of a controlled and export-approved infrastructure, thereby giving rise to a substantial threat of a crypto-with-a-hole.

In this environment, however, it is assumed that the commercial software which makes use of the cryptographic infrastructure is relatively benign, for if it could be shown that the application was designed in such a way as to facilitate such a substitution without substantial effort, the application developer would presumably be in violation of the export laws if they shipped such a product outside of the U.S. or Canada, or if they imported or used it in violation of the laws of those countries which prohibit it.

Therefore, if the application which invokes the cryptographic function were able to authenticate the cryptographic infrastructure prior to invoking it, and perhaps later during a series of ongoing invocations as well, in order to reasonably prevent the unauthorized substitution of a different set of capability after the initial authentication, then a reasonable level of assurance could be provided to the export authorities that although the application makes use of cryptography, it does not contain it, and in addition contains mechanisms to ensure that only the approved cryptographic infrastructure is invoked without the possibility of substitution, the application does not give rise to a crypto-with-a-hole problem. The applications would then presumably deserve an expedited export review process, or ideally no export license would be required at all.

Unfortunately, there are certainly obvious difficulties in implementing such an authentication mechanism, not the least of which is that the only effective way to authenticate an application is through the use of cryptography, and it is the use of cryptography that we are trying to authenticate! This apparently circular reasoning requires very careful controls on exactly what kinds of cryptography is used to do the authentication, and where and how it is implemented, in order not to violate the basic controls that are to be enforced.

Accordingly, a need exists for a system through which two independent, resource sharing, executable entities may authenticate the identity, origin, and continuing integrity of the other.

Such a system is likewise needed whereby an application entity may access the resources of an underlying base entity (such as an operating system) in a manner by which it can be assured that the resources being shared are authorized and in compliance with government and vendor policies.

Such a system is similarly needed whereby counterpart components of the system may be flexibly distributed into standard authenticating modules and authenticated modules which are capable of inclusion into applications entities and base entities, respectively, and which can be statically linked in a trustworthy manner within those entities, while being dynamically linkable to each other.

OBJECTS AND BRIEF SUMMARY OF THE INVENTION

The apparatus of the present invention has been developed in response to the present state of the art, and in particular, in response to the problems and needs in the art that have not yet been fully solved by currently available technology. Thus, it is an overall objective of the present invention to provide a system and method whereby independent, resource sharing, executable entities can unilaterally or bilaterally authenticate other such entities prior to the sharing of resources between the entities.

Consistent with the foregoing object, and in accordance with the invention as embodied and broadly described herein, an apparatus and method are disclosed in certain embodiments of the present invention as including a method and apparatus for effecting secure communications between independent, resource sharing, executable entities.

In order to effect the secure communications, the present invention initially authenticates unknown executable entities to each other, either unilaterally or bilaterally. As a further feature of the present invention, an enduring authentication state may be maintained, and may make minimal use of cryptography in the executable entity which seeks to authenticate the other.

In an instance wherein an application executable entity (e.g., a software program) wishes to authenticate a base executable entity (e.g., a network operating system), the process includes sending a challenge nonce from the application to the base executable entity. The base executable entity digitally signs the challenge nonce. The base executable returns to the application the signed challenge nonce and its own generated nonce as a pair of variables. The application executable entity unwraps the signed challenge nonce with a public key to authenticate the base executable. The application also authenticates the base executable's nonce, decrypting it, if required, and using it in ongoing authentication of subsequent calls or messages to the base executable.

The dynamic authentication system and method may also require that the application executable entity authenticate the base executable entity with a chain of asymmetric key pairs, the public keys of which may be embedded in digitally signed certificates. In one embodiment, the public key pairs include a run-time-generated public key pair, a per-instance (e.g., release-time, or distribution time) public key pair, and a certifying authority master or root key pair.

The chain of digitally signed keys that is used in the authentication process may be in a standard certificate format such as that specified by X.509 or in a proprietary format. The chain of signed keys may include a run-time key which is generated at application start-up on a per-context basis; a distribution-time key which is unique per server and is generated at either install time or at customer order time; a per-release key which is generated by the vendor at the time of release of a particular version and/or for a particular customer set, country, or region; and the top-level or root, a vendor-master key, which has a relatively long life span. In general, a list of one or more root or top-level public authentication keys may be securely embedded in the application entity in such a way as to make difficult replacement without substantial reverse engineering. The chains of certificates corresponding to each root may contain certificate attributes reflecting properties of certificates such as the quality of the confidentiality protection for the private key, the cryptographic process quality for creation of the certificate, and the identity of the enterprise creating any certificate in the chain. Thus quality attributes may be used as constraints on authentication of a base executable.

The use of a run-time key plus a distribution-time key and a per-release key adds a dimension of both space and time variability to ensure that a compromise of one of the keys is not sufficient to defeat the entire system. The inclusion of a standard distinguished name or other identification information (such as a license number) in the distribution-time key certificate may readily identify anyone attempting to distribute a valid distribution-time private key and certificate to other unauthorized users. Standard certificate revocation list technology or a certificate registry may then be used to revoke any misused certificates. The use of a short-lived run-time key permits the use of short public-key encryption keys, which in turn facilitates the periodic re-authentication of the state of the two applications. The two applications may be either statically or dynamically loaded on the same computing system, e.g., as part of an operating system which is called by an invoking program, or they may be separated and communicate via an arbitrary communications link and protocol.

Once the identity, origin, and integrity of the base executable entity has been authenticated by the application entity using the challenge and response and the chain of asymmetric key pairs, a signed state variable (e.g., the base executable's nonce) is preferably used to maintain an on-going state synchronization between the base and the privileged utility set in the application, and continue the authentication across multiple function calls.

The state variable can be made a function of the number of calls and the contents of all of the arguments which are passed back and forth between the application entity and the base entity, and is updated by both the application entity and the base entity after every call. For example, simple incrementation of the nonce by the base executable and the application may suffice, Alternatively, the use of a secure hashing function such as SHA-1, for example, may improve security. The state variable can then be used to modify the interface between the two applications, e.g., by adding or Exclusive Or-ing (X-ORing) the variable with the address of the parameter list(s) being passed back and forth, so that if the state variables are not synchronized between the two applications, the function calls will fail to work properly.

Accordingly, if an interloper attempts to replace the base entity after the initial authentication, he/she will not know the correct state information unless he/she has been monitoring all of the communications in both directions since the state information was last authenticated. Encrypting the base executable nonce and its updated values may be employed to resist this type of attack from interlopers.

To further protect against the possibility of this kind of a man-in-the-middle attack, the authenticating application can issue a new challenge as often as necessary, for example when changing context or prior to any critical operation. Since the challenge is taking place in real-time, a short private key can be used for the run-time key used to sign the challenge, so the operation will take a minimal amount of time. In addition, since the run-time key and per-instance key have been previously validated, that step of the process will not have to be repeated.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
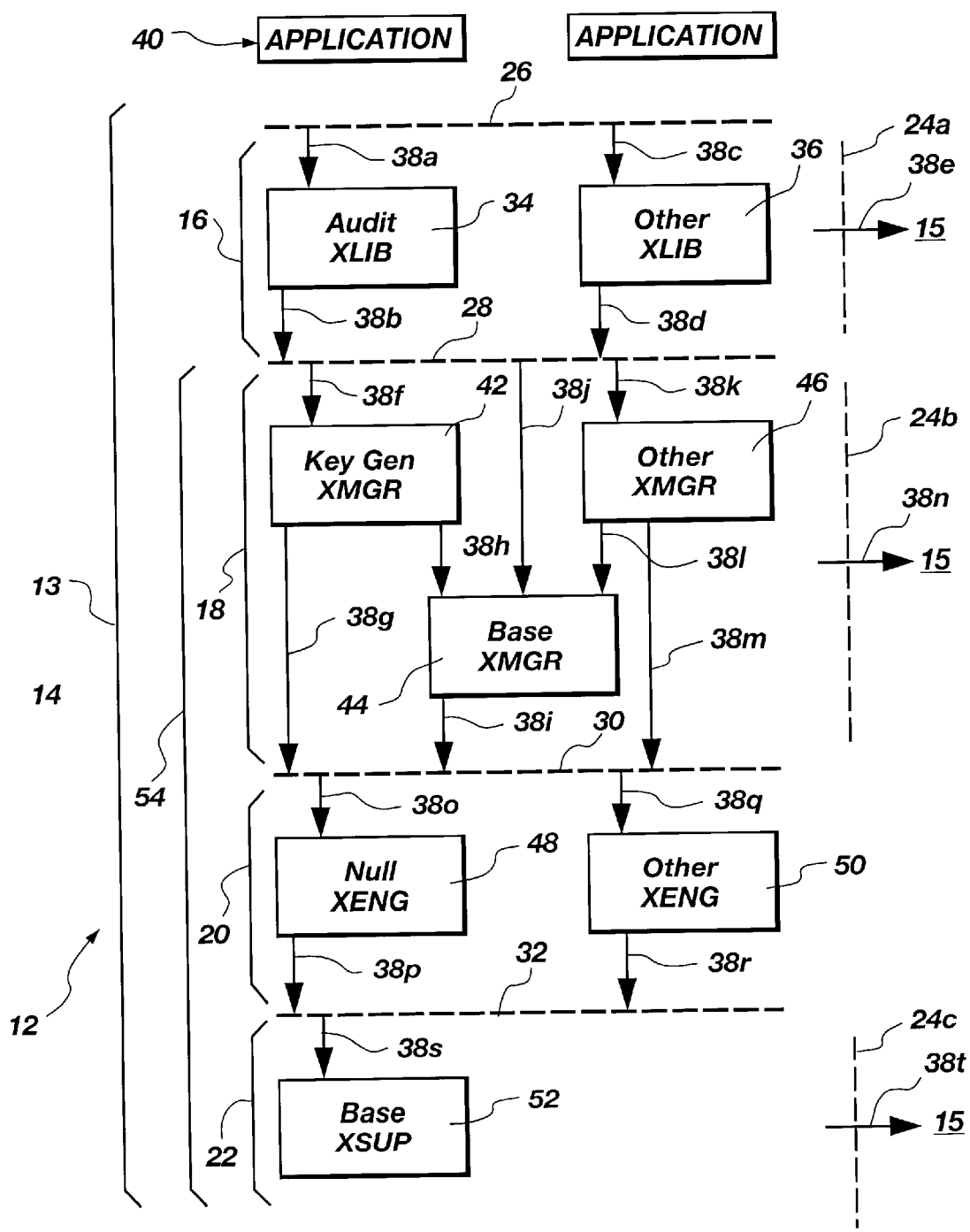
FIG. 1 is a schematic block diagram of modules arranged in one embodiment of an architecture for an apparatus and method in accordance with the invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 13, is not intended to limit the scope of the invention, as claimed, but it is merely representative of certain presently preferred embodiments of the invention.

The presently preferred embodiments of the invention will be best understood by reference to the drawings, wherein like parts are designated by like numerals throughout. Reference numerals having trailing letters may be used to represent specific individual items (e.g., instantiations) of a generic item associated with the reference numeral.

Controlled Modular Cryptography

Referring now to FIGS. 1–6, a controlled modular cryptography (CMC) process 12 may be implemented using a plurality of modules 13. The CMC process 12, alternately referred to herein as CMC 12, may be embedded within another executable 14 such as a network operating system 14. The network operating system 14 may include an operating system proper 15, what would conventionally be known in a generic operating system as the operating system 15.

The network operating system 14 may also have provision for insertion of a preprocessor 92 in a conventional hole 93.

By contrast, the CMC 12 is not accessible by third parties at a pre-processor slot 93. Third parties may create pre-processors 92 having direct access to the Operating system 15. Prior art cryptographic engines are often mere preprocessors interposed between applications 40 and the operating system 15. Likewise, the unauthorized installation by a third party of a cryptographic engine in a pre-processor slot 93 may be rendered virtually impossible by the CMC 12 and operating system 15. Instead, the CMC 12 may be loaded into the base executable 14 such as the operating system 14 in a manner that embeds the CMC 12 into the operating system 14 and prevents interfacing by any third party to the cryptographic capability of the CMC 12. (See FIG. 3.)

Referring now to FIGS. 1–6, and more particularly to FIG. 1, the controlled modular cryptography 12 may include library modules 16 for interfacing with applications 40. Each library module 16 (X library 16, or simply library 16) may be application-specific.

The loader 90 (see FIG. 3) provides layering (hierarchical linking) or nesting (recursive loading or linking) of interfaces. The layering may effectively prevent applications 40 on an operating system proper 15, for example, from interfacing directly with controlling modules 13 (e.g., manager modules 18) or with engines 20 (e.g., cryptographic engine 50). The loader 90 may do this directly by dynamic loading of modules 13, enforcing restrictions on access to interfaces between levels 16, 18, 20, 22, 15 illustrated in FIG. 1.

Manager modules 18 as well as the original loader 90 loading a filler 12 (CMC 12) may assure that a layering hierarchy is enforced between modules to limit interfaces. Manager modules 18 may interface with library modules 16. The manager modules 18 may also interface with the cryptographic engines 20, or engine modules 20. Support modules 22 may interface with engine modules 20 also.

Library modules 16, manager modules 18, and support modules 22 may interface with the operating system 15 in one preferred embodiment of an apparatus and method in accordance with the invention. The engines 20 may be enabled to interface only with other modules 13, and not with the operating system 15.

By the subdivision of modules 13 in a layered architecture (e.g., layer 18 is manager modules 18 including modules 42, 44, 46), great flexibility may be obtained. Since modules 13 are dynamically bound by the loader 90, and managed by a manager module 18, the modules 13 may be modified or exchanged as needed and as authorized. Management modules 18 not yet envisioned may be added in the future, without revising the base executable 14, or even the filler 12, outside the module 13 in question.

For example, a management module 18 may support cryptographic-token PIN (personal identification number) management, not available in an initially purchased product 14. Another example may be added support for policy management enhancements, such as providing separate APIs (application programming interfaces) for encrypting and decrypting ubiquitous financial data used by banks.

New functionality, not typically used or required in current practice by banks, may include a separate key type or size specifically for financial data. Such keys 156, 160 may be relatively stronger than general keys 156, 160, while use, holders, data types, and the like may be restricted by policies 164 crafted for special financial purposes. Thus financial keys 156, 160 may be managed differently from other general types of keys 156, 160.

Figure 2:
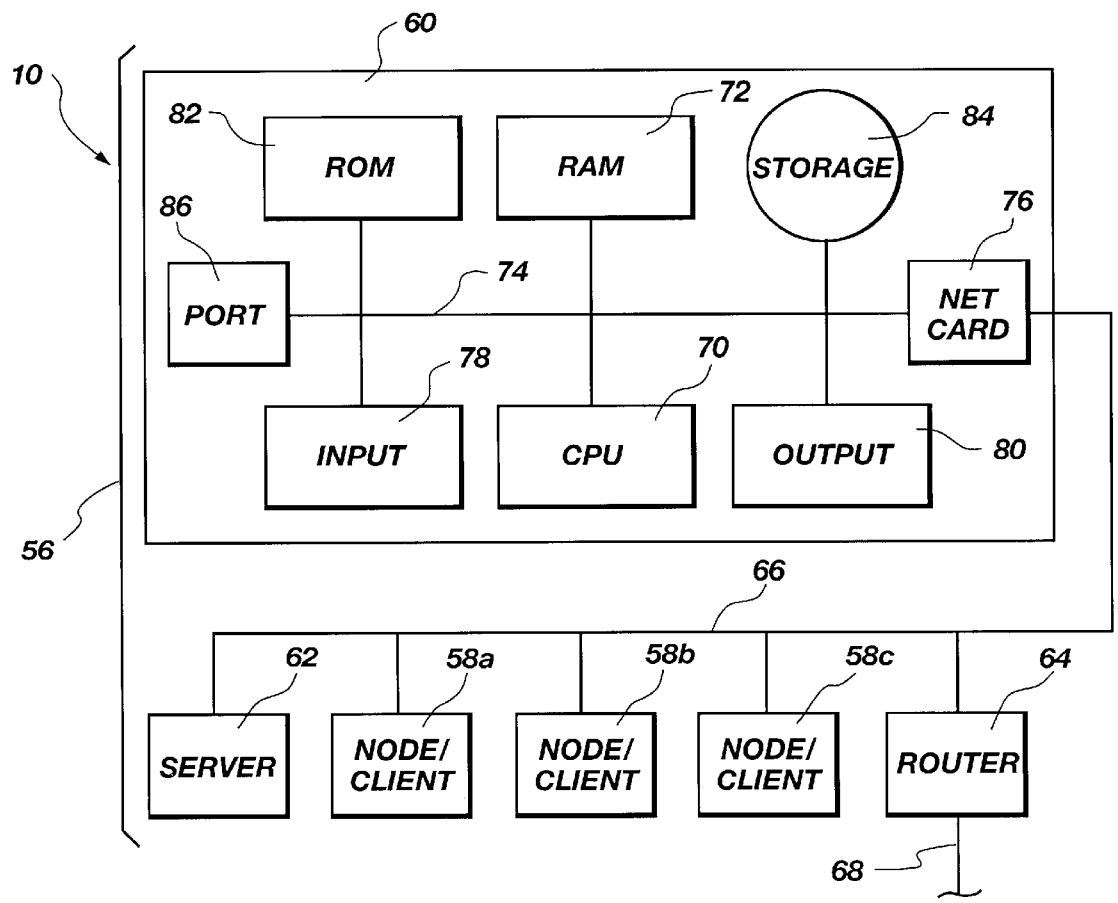
FIG. 2 is a schematic block diagram of an apparatus in a network for hosting and implementing the embodiment of FIG. 1.

Referring now to FIG. 2, a network 56 may comprise a plurality of nodes 58 (e.g., clients 58). Although the clients 58a, 58b, 58c are illustrated, the computers of the clients 58, server 62, and router 64 may also be thought of as being hosted, programmed to run on, any computer 58, 60, 62, 64 on a network 56. Likewise, the CMC 12 may be programmed into any of those computers 58, 60, 62, 64. By node is meant a computer on a network 56 in its broadest sense.

Likewise, the host 60 or server 60 may actually be programmed to function as one of several servers 62 or routers 64. As a practical matter, the server 62 may be replaced by the server 60. A node 58 may include some or all of the structural contents illustrated for the server 60. For example, if every node 58 comprises a computer, every node 58 may have any or all of the components 70–86.

A network 56 may include a backbone 66 for interconnecting all the nodes 58 or clients 58. The router 64 may also connect to one or more other networks 68. The network 68 may be a local area network (LAN), wide area network (WAN) or any size of internetwork.

The server 60 may include a CPU 70 or processor 70 for hosting the operating system 14 and CMC 12. As a practical matter, a random access memory 72, or RAM 72, may temporarily store, in part or in total, any or all codes and data associated with executables within the CMC 12. For example, during operation of the CMC 12, individual modules 13 might be stored, or a portion thereof might be stored in the RAM 72.

The CPU 70 and RAM 72 may be connected by a bus 74. Also on the bus may be operably connected a network card 76 or network interface circuit 76 (net card 76), one or more input devices 78, and output devices 80, or the like. Additional memory devices such as a read-only memory 82 (ROM 82) and a storage device 84 (such as a hard disk 84), may be operably connected to the bus 74 to communicate data with the processor 70.

Additional ports 86 may be provided as appropriate. As a practical matter, the input device 78 and output device 80 may merely represent ports for accessing one or more available input or output devices 78, 80. Similarly, with the distributed nature of hardware and software in a modern computing environment, other devices may be accessed, through the net card 76, elsewhere on the network 56.

Referring to FIG. 1 once more, the interfacing between modules 13 may be restricted. Such a restriction may provide additional assurance that the CMC 12 may not be misused, modified, or replaced improperly. Therefore, certain of the modules 13 may have operating system interfaces 24. For example, the interfaces 24a, 24b, 24c represent the interfaces between the libraries 16, managers 18, base 22, respectively, shared with the operating system 15.

In the illustrated embodiment of FIG. 1, the engines 20 share no interface with the operating system 15. Instead, the engines 20 may interface through the base support 22. Library interface 26 represents the interface between library 16 and applications 40. The library interface 26 may be considered to be an interface between the CMC 12 and applications 40.

The libraries 16 may be structured to interface directly with applications 40. The foundation 54 or the CMC foundation 54 may be thought of as the core of the CMC 12. The managers 18 provide cryptographic facility as well as controlling access to and between modules 13, especially in the core 12. The interface between the CMC enforcement by the foundation 54 and applications outside the base executable 14 is moved away from the manager interface 28 by the library interface 26 and interposed libraries 16. Thus, applications 40 are not permitted to interface directly with the (controlling) management modules 18. This further avoids creation of cryptography with a hole.

The manager interface 28 represents the interface between the manager modules 18 and the library modules 16. The engine interface 30 represents the interface between engines 20 and the manager modules 18. The support interface 32 represents the interface between the engines 20 and the support modules 22.

In general, communications 38 may be calls from upper layers 40, 16, 18, 20 to lower layers 16, 18, 20, 22, respectively, in FIG. 1. Each layer 18, 20, 22 may properly execute without requiring anything from a layer 16, 18, 20, respectively, above.

In one embodiment of an apparatus and method in accordance with the invention, one library 16 may be an audit library 34. For example, the audit library 34 may have functional responsibility for encrypting security audit data for storage. The underlying data may correspond to events of significance to audit executables. The network 56 itself may be managed by an individual acting as a system manager, yet the audit data encrypted by the audit library 34 may be inaccessible to the system manager.

Other libraries 36 may be provided. Each of the libraries 36 may be application-specific. In one presently preferred embodiment, each of the applications 40 interfacing at the library interface 26 may have an associated, unique, library module 36 provided.

The key generation manager 42 may create symmetric keys or asymmetric key pairs provided to cryptographic engines 20. The key generation manager 42 may also perform the escrow function of the escrow archive 170 (see FIG. 6). A base manager 44 may provide enforcement of policies 164.

Restrictions on access to modules 13, such as the engines 20, and access to cryptographic algorithms within engine modules 20, and the like, may be enforced by the manager modules 18. In one embodiment of an apparatus and method in accordance with the invention, the base manager 44 may provide an enforcement function with respect to all functions and all modules 13. Other managers 46 may also be provided. For example, manager modules 46 may alter methods of policy enforcement for the escrow of keys 156.

In one embodiment, the CMC 12 may be provided with a null engine 48. A null engine 48 may be operated to interface at the engine interface 30 and the support interface 32 while providing no enablement of cryptographic capability. Thus a base executable 14 may be fully functional otherwise, including all necessary interfaces to the filler 12 (CMC 12), while having no enabled cryptographic capability. The interfaces 26, 24 to the filler 12 may be as secure as if the dynamically loaded modules were manufactured as integrated portions of the base executable 14.

Thus, an apparatus 10 may be provided as a base executable 14, having fully imbedded support for a cryptographic engine 20. However, the presence of a null engine 48 accommodates all the proper interfaces 30, 32 while actually providing no cryptographic capability.

Thus, a CMC 12 (filler 12) may be provided with a base executable 14, including a null engine 48, exhibiting minimal differences with respect to the operating system 15 as compared to another cryptographically-enabled product. Meanwhile, other engines 50 may be provided by a manufacturer or a third party vendor authorized to create cryptographic engines 20 according to some policy and authorization.

A base support module 52 may provide some minimal set of operating system instructions for the engines 20. That is, in general, the engines 20 need some access to the operating system. Nevertheless, for providing the assurance that engines 20 may not be created, modified, extended, circumvented, inserted, or the like, in an unauthorized fashion, the support module 52 may intervene. Thus, the base module 52 may provide access to some limited number of functions from the operating system 15 for the engine 20.

Figure 3:
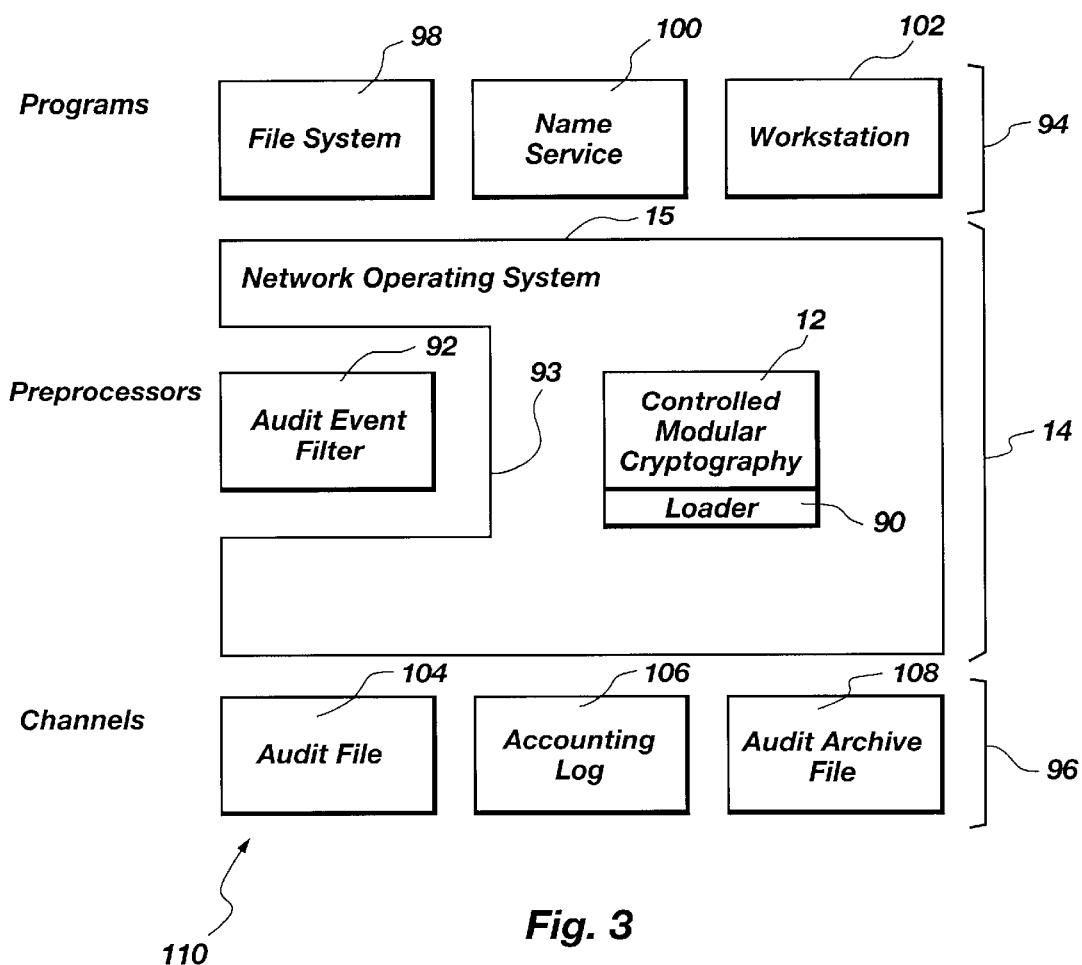
FIG. 3 is a schematic block diagram of an example of executables operable in a processor for implementing the embodiment of the invention illustrated in FIG. 1.

Referring now to FIG. 3, an operating system 14 may be implemented in one embodiment of an apparatus and method in accordance with the invention to include a loader 90. The loader 90 may be associated with the operating system proper 15. The functional responsibility of the loader 90 may be to dynamically load and properly link all modules 13 into the CMC 12 (filler 12), for example, installing (e.g., embedding) them into the operating system 14. More specifically, the loader 90 may be tasked with the functional responsibility to provide all proper linking between modules 13. Linking may be enabled on a layer-to-layer (or interface 28, 30, 32) basis rather than on a module-by-module basis. For example, a binding may exist between any two modules 13 in a layer (e.g., layer 18, or layer of manager modules 18). Binding may also exist between any module (e.g., modules 42, 44, 46) in that layer (e.g., layer of managers 18) and another module (e.g., modules 48, 50) in a layer (e.g., layer 20, or layer of engines 20) sharing an interface (e.g., interface 30) with that layer (e.g layer 18).

Specific modules 13 need not be individually limited and controlled by the loader 90. In one embodiment, individual modules 13 may be bound (linked). Thus, for example, only those functional features authorized for a key generation manager 42, or a cryptographic engine 50, might be enabled by being properly bound.

In one example, a cryptographic engine 50 may be manufactured to contain numerous algorithms. However, according to some policy 164 (see e.g., FIGS. 5, 6) associated with a certificate 154, a manager 46 and the loader 90 may limit linking (binding) to an enablement of algorithms and engines 20. A manager module 46 may also control key usage, including length and function. Function may be distinguished between, for example, encryption versus authentication. Use may be controlled based upon, for example, a manufacturer's (of the module 13) signature 162 and key type.

The operating system 15 may support a selection of preprocessors 92 such as the audit event filter 92. Preprocessors may be adaptable to fit in a hole 93 readily available for the purpose. In one currently preferred embodiment of an apparatus and method in accordance with the invention, a CMC 12 is not adaptable to be implemented as a preprocessor 92. Instead, the CMC 12 may be limited to interfacing only with the operating system proper 15 as illustrated in FIG. 1, and only after proper loading by a loader 90. Even within the operating system 15, the CMC 12 may be limited to interfacing with the operating system 15 through a limited number of interfaces 24.

As a practical matter, certain applications 94 or programs 94 have resident portions within the server 60 hosting the operating system 14. For example, a file system 98, a name service 100, a work station 102 and the like may have resident portions operating in the processor 70. Even if, for example, a server 62 is operating as a file server, the file system 98 may be a portion of a file server executable that needs to be resident within the processor 70 of the server 60 in order for the server 60 to communicate with the server 62 over the network 66.

Generally, certain data may need to flow into and out of the operating system 14. Accordingly, a number of channels 96 or data flow paths 96 may need to exist. As a practical matter, the channels 96 may be comprised of either paths, data itself, or as executables hosted on the processor 70 for the purpose of providing communication. Thus, an audit file 104, an accounting log 106, an archive file 108, and the like may be provided as channels 96 for communication.

Thus, the overall operating system 14 along with the applications 94 and channels 96 may be thought of as a local system 110 or the local processes 10. These local processes 110 operate within the CPU 70. The CPU 70 is a processor within the server 60 or host 60. As a practical matter, the processor 70 may be more than a single processor 70. The processor 70 may also be a single processor operating multiple threads under some multitasking operating system 15.

Figure 4:
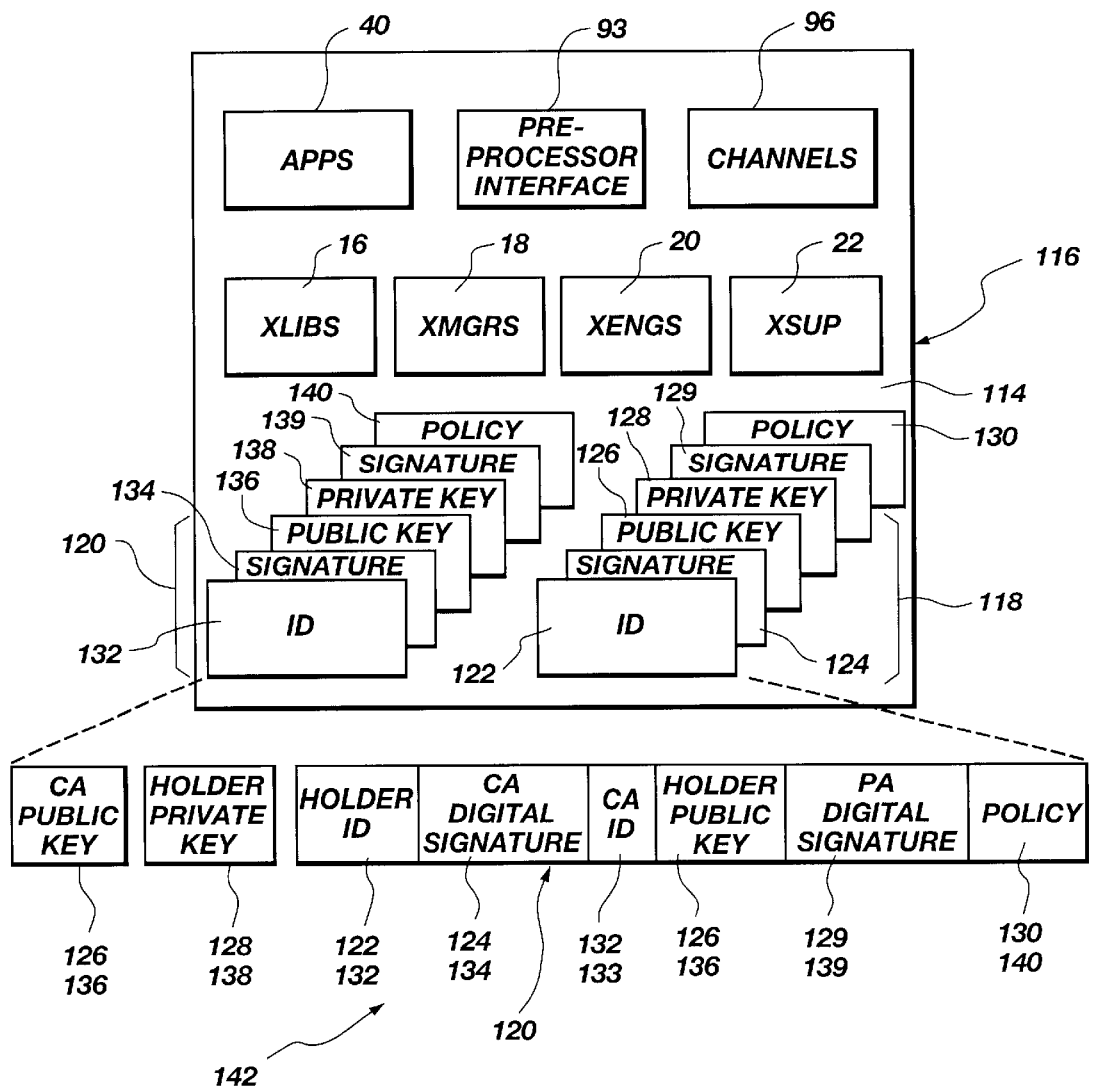
FIG. 4 is a schematic block diagram illustrating examples of data structures in a memory device corresponding to the apparatus of FIGS. 1–3.

Data representing executables or information may be stored in a memory device 72, 82, 84. Referring now to FIG. 4, one may think of a dynamic data structure 114 or an operating system data structure 114 storable in an operable memory 116. That is, for example, the operating memory 116 may be within the RAM 72 of the host 61. All or part of the data structure 114 may be moved in and out of the processor 70 for support of execution of executables.

The data structure 114, may be dynamic. The modules 13 for example, may be dynamically loadable, such as network loadable modules. Thus, for example, a host 60 may operate without having any fixed, storable, data structure 114. That is, no static data structure need be assembled and stored in a manner that may make it vulnerable to being copied or otherwise inappropriately accessed. The data structure 114 may only exist dynamically during operation of the processor 70, and even then need not all exist in the memory device 116 (e.g., RAM 72) simultaneously at any time. Thus, additional assurance is provided against misuse, and abuse of data and executables in a CMC 12 associated with an operating system 14.

The data structure 114 may contain a certificate 118 and certificate 120. A certificate 118, for the purposes of FIG. 4, may be thought of as an instantiation of a certificate 154 associated with the operating system 14 and its included CMC 12. The certificate 118 may be thought of as the data certifying the holder of a certificate operating and using the data structure 116. By certificate 120 is meant data provided in a certificate issued to the holder.

A certificate 118, 120 may also be thought of as a binding of a holder ID 122, 132 to a public key 126, 136, certified by a digital signature 124, 134 of a certifying authority. An issuer (e.g., 152b) or authority and a holder (e.g., 152d) may each be a holder (e.g., 152b) to a higher authority (e.g., 152a), and issuer (e.g., 152d) to a lower holder (e.g., 152h of FIG. 6), respectively.

When discussing authorities, holders, receivers, and the like, it is important to realize that such an authority, holder, sender, receiver, or the like may actually be a hardware device, or a software operation being executed by a hardware device. Any hardware device, operating software, or data structure in a memory device may be owned, controlled, operated, or otherwise associated with an individual or an entity. Nevertheless, insofar as the invention is concerned, names of such entities may be used to represent the hardware, software, data structures, and the like controlled or otherwise associated with such entities.

As a practical matter, a certificate 118 authenticating the rights of the CMC 12 may contain an identification record 122 identifying the holder (the specific instance of the CMC 12), a signature record 124 verifying the higher certification authority upon which the holder depends, and a public key record 126 representing the public key of the holder. The private key 128 may be very carefully controlled within the CMC foundation 54 using encryption for wrapping. The private key 128 may be associated with the holder (CMC 12) and is the private half 128 of a key pair including the public key 126. Thus, by means of the private key 128, the holder may create the signature 134 in the certificate 120 for another use of the key pair 136, 138.

Meanwhile, a certification authority 152 (see FIGS. 5–6) may provide to a holder or sign 166, the certificate 118 (one of the certificates 154). The certificate 120 may reside in another computer or simply be allocated to a different thread or process than that of the certificate 118.

As a practical matter, a private key 128, 138 may be protected by physical security. Therefore, a private key 128, 138 may typically be controlled and be cryptographically wrapped except when dynamically loaded into a dynamic data structure 114.

The private key 128 may be used to certify an identification record 132 identifying a new holder. A signature 134 created by use of the private key 128 may verify the authenticity and quality of the certificate 120 and public key 136. The public key 136 may be thought of as the matching key 136 to a key pair including the private key 138 created by the new holder of the certificate 120. That is, one may think of a new holder, as a process, or an individual, issuing a public key 136 certified by the signature 134 of the private key 128 as duly authorized to create software which functions within the limits of a policy 140. The certificate 118, an instance of a certificate 154 held by the CMC 12, may have a signature 124 by a higher certifying authority 152.

A policy 130, 140 may limit the authorization of the holder identified by the ID 122, 132 and certified by the digital signature 124, 134. A policy 130, 140 may incorporate the limitations governing the use of algorithms in engines 20, for example. Thus, a policy 130, 140 may be thought of, for example, as the rules enforced by a manager module 18 controlling access to and from a module 13, such as an engine (e.g., cryptographic engine 50).

Each policy 164 (e.g., 164d, see FIG. 5) may contain a digital signature 163 (e.g., 163d) of the certifying authority 152 (e.g., 152b) above the holder 152 (e.g., 152d) of the certificate 154 (e.g., 154d) and policy 164 (e.g., 164d). The policy 164 (e.g., 164d) may thus be bound to the corresponding certificate 154 (e.g., 154d) by the digital signature 163d.

In one embodiment, policies 164 may be generated by a separate policy authority using a policy authority digital signature 129, 139 (see FIG. 4). A policy authority signature 129, 139 binding a policy 130, 140 to a certificate 118, 120 need not be different from a certificate authority signature 124, 134, but may be. This is analogous to the certification authorities 152 for certificates 154. Thus, the policies 164 may be provided and signed 166 by a certifying signature 163 binding the policy 164 to a corresponding certificate 154. Nevertheless, the policy 164 may be certified by a policy authority 129, 139 other than the certificate authority 152 creating the corresponding certificate 154.

Figure 5:
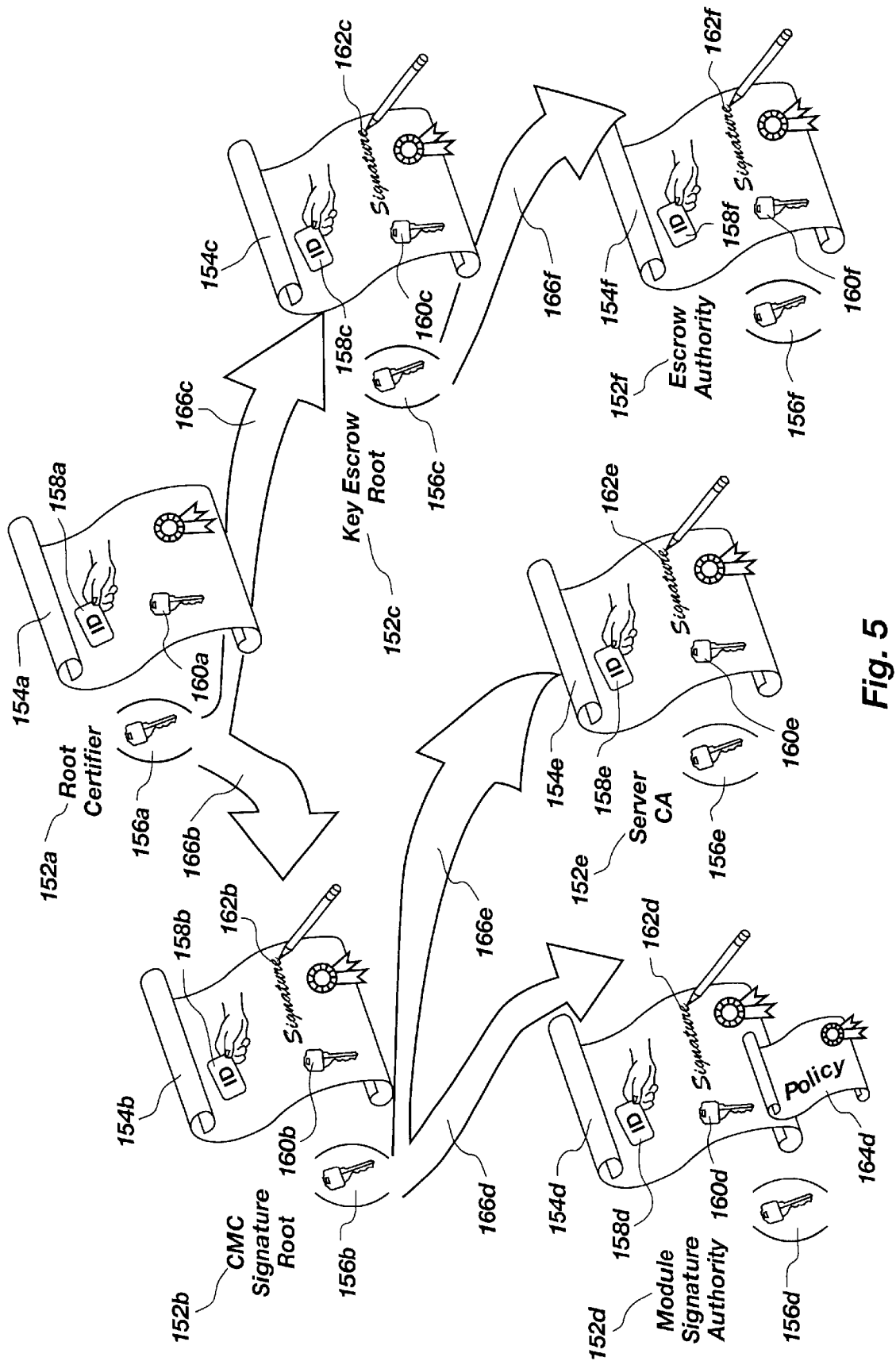
FIG. 5 is a schematic block diagram illustrating certificate hierarchies for implementing one embodiment of an apparatus and method in accordance with the invention.
Figure 6:
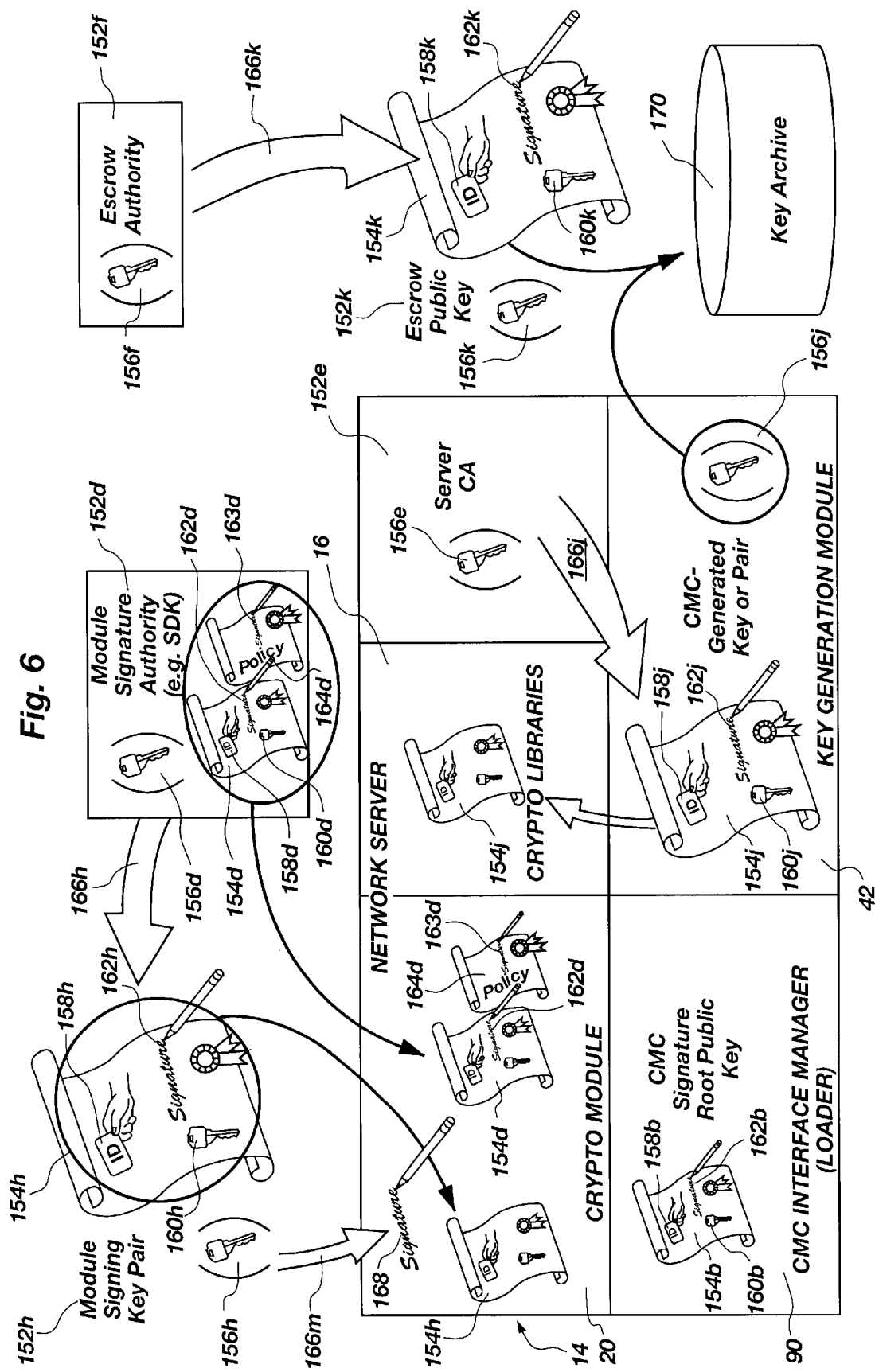
FIG. 6 is a schematic block diagram of certain operational processes for one embodiment of a controlled modular cryptography system implemented in accordance with the invention.
Figure 7:
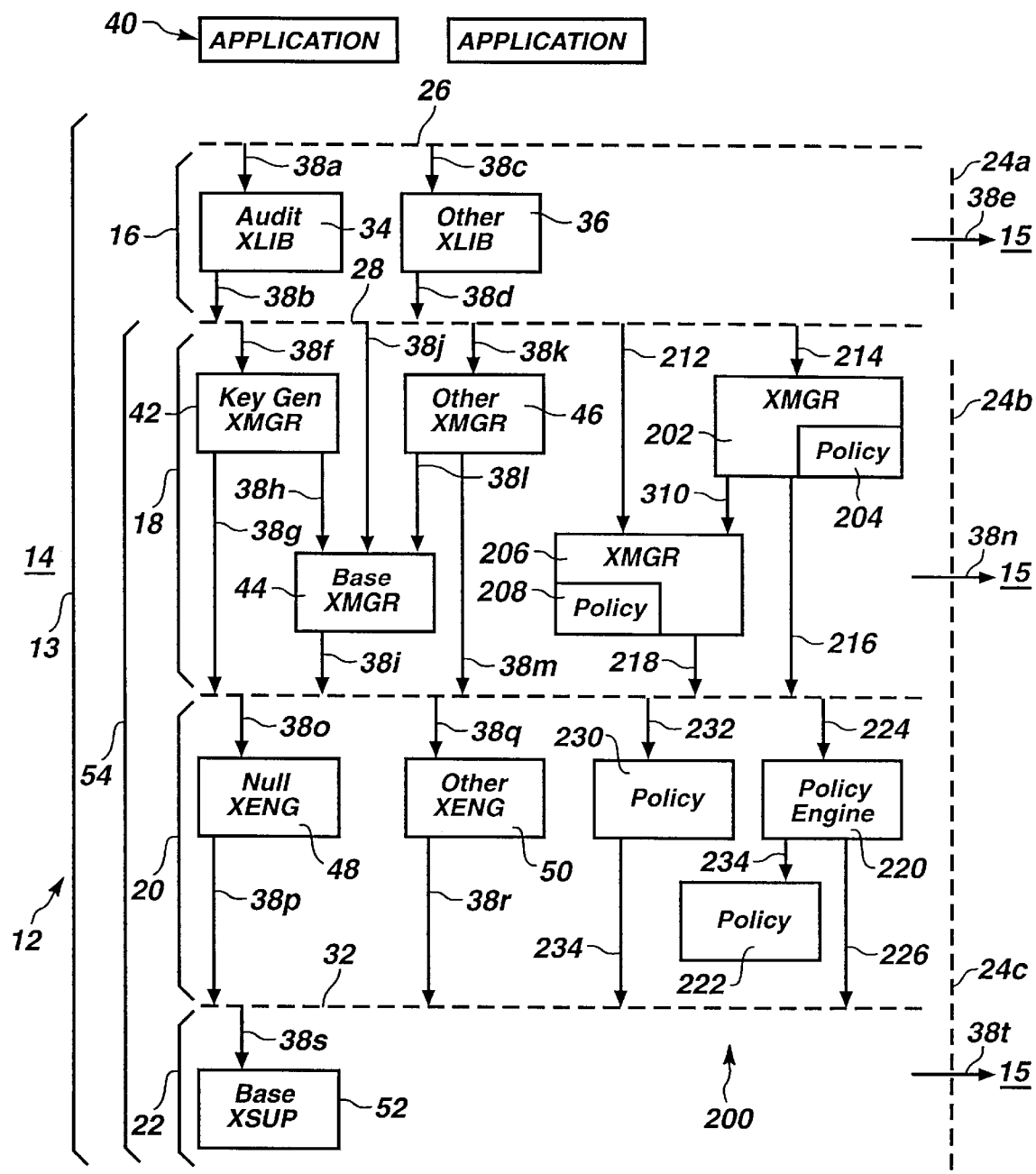
FIG. 7 is a schematic block diagram of modules arranged in an alternative embodiment of an architecture of the present invention.

Referring to FIGS. 4–6, the certificate 118 may include identification records 122. The identification records 122 may contain information recursively identifying the higher certifying authority (e.g., 152a, 152b), as well as the holder (CMC 12) certified. However, the signature 124 may be verified by using the public key of the higher authority 152. For example, the signature records 124 may comprise a signature of a signature root authority 152b or higher authority 152a certifying, which authority is known by the identification 133. The private key 128 may be thought of as a key by which the holder (e.g., the CMC 12) creates signatures 134 for certificates 120 associated with, for example the key generation module 42 of the base executable 14 (see FIG. 6).

The identification records 132 may typically identify the holder of the certificate 154 associated with the certificate 120. Although the signature 134 is associated with the certifying authority providing the certificate 120, and itself holding the certificate 118, identification records 133 may identify the certifying authority 152 (e.g., associated with the ID 122). The signature 134 may be used by entities or processes needing to verify the authorization of the holder (entity identified by the ID 132) of the certificate 120.

As a practical matter, a private key 128, 138 is typically not stored in the clear in any non-volatile storage generally available. That is, a private key 128, 138 may typically be unwrapped or loaded only dynamically to minimize the chance of any unauthorized access. The private key 128, 138 may optionally be stored within a cryptographic co-processor, for example an additional processor 70. The cryptographic co-processor may be embodied as a chip, a token, a PCMCIA card, a smart card, or the like. The private key 128 may be unwrapped in the co-processor for use only within the co-processor.

The applications 40 the preprocessor 93 and the channels 96 may be stored in the data structure 114. Nevertheless, the data structure 114 may be distributed.

The library modules 16, the manager modules 18, the engines 20, and the support modules 22 may be stored in the data structure 114. In one embodiment, the data structure 114 may all be resident in the RAM 72 in some dynamic fashion during operation of the operating system 14 functioning in the processor 70.

The certificate 120 may be embodied as illustrated in the frames 142. The identification record 132 may be thought of as a data segment 132 associated with a holder. The segment 133 may be provided to identify a certifying authority 152. Each public key 136, 126 may be represented as bits of a segment 136, 126 in the frame 142. The signature 134, 124 of a certifying authority 152 may be represented as another set of bits of a segment 134, 124 in the frame 142. The policy 140, 130 may be represented by another segment 140, 130. The certificates 118, 120 may have corresponding (e.g., even identical) policies 130, 140 under which to operate.

The public key 136, 126 is identified with the holder ID 132, 122. A public key 136, 126 is typically published to other functions or to other entities, just as a certification authority's 152a, 152b, 152c public key 160a, 160b, 160c is published. Thus, a Certifying authority's public key 136, 126 is illustrated in FIG. 4 as being separate from the frame 142. The public key 136, 126 may be embedded in another certificate held by a certifying authority. Similarly, a holder's private key 138, 128 may be maintained with utmost security. Therefore, a holder's private key 138, 128 is not available with the holder's published public key 136, 126, except to the holder. Thus, a holder's private key 138, 128 may not actually be generally available or associated with the certificate 120, or certificate 118, respectively, in the frame 142.

Referring now to FIGS. 4–6, the certificate hierarchy is illustrated, as is the implementation of operational keys 156, 160. Reference numerals having trailing letters, may be thought of as specific examples of a generic structure or function associated with the reference numeral alone. Thus, a certifier or certification authority 152 is a general expression, whereas the root certifier 152a and the CMC signature root 152b are specific examples of a certification authority 152.

In general, an authority 152 (e.g., root certifier 152a), may issue a certificate 154 (e.g., 154b, 154c) A certificate 154 (e.g., 154b, 154c) may be associated with authorization of a certificate holder (e.g., 152b, 152c) by a certification authority, 152 (or just authority 152). Associated with a certificate 154 may be certain data 120, 118. For example, in one embodiment, a certificate 154 may actually be embodied as a frame 142 as illustrated in FIG. 4.

In general, a certificate 154 (e.g., 154b) may be prepared by an authority 152 (e.g., 152a) using a private key 156 (e.g., 156a) held securely in the possession of the authority 152 (e.g., 152a). A certificate 154 (e.g., 154b), itself, may contain information such as the holder identification 158 identifying the holder to whom the authority 152 has issued the certificate 154. Note that the holder 152 (e.g., 152b) may itself be another authority 152 (e.g., 152b) to a lower level holder 152 (e.g., 152d).

The certificate 154 may also include the authority's 152 signature 162. By signature 162 is meant, a digital signature as known in the cryptographic art. Also included in the certificate 154, or linked by the signature 162 with the corresponding certificate 154, may be a policy 164. A policy 164 represents the extent of the authorization provided by the certificate 154 (, 154b) to the holder (e.g., 154d) of the certificate from the authority 152 (e.g., 152b) in order to produce cryptographic functionality.

For example, a holder 152d may have a certificate 154d and private key 156d authorizing the holder 152d to produce modules, such as cryptographic engines 20, manager modules 18, library modules 16, or symmetric or asymmetric keys 156. The policy 164d may embody the restrictions, limitations, and authorizations extended to the holder 152d of the certificate 154d.

In one embodiment, the enforcement of policies 164 may be managed in one or more of several, relatively sophisticated ways. For example, a policy 164 might permit a private key of a relatively long length, such as 1024 bits, to be used for digital signatures 162 only. On the other hand, a private key 156 used to wrap symmetric keys may be permitted to extend only to 768 bits, and only on condition that the key 156 be escrowed.

Also, rules for "composition" of policies 164 (certificated features or functions), or perhaps more descriptively, "superposition" of policies 164, may be embodied in manager modules 18. For example, more than a single policy may be loaded within a filler 12, for one of several reasons. For example, modules 13 from different vendors may be manufactured under different authorities 152. Also by way of example, as in FIG. 4, a policy authority digital signature 129, 139, certifying a respective policy 130, 140, need not be from the same source as a certificate authority digital signature 124, 134, but may be.

Meanwhile, a manager module 18 may be programmed to enforce the most restrictive intersection of all features (e.g., certificated features or functions such as quality, cryptographic strength, etc.). For example, one policy 164 (a certificated feature) may require that key-wrapping keys may be 1024 bits long and must be escrowed. Another policy 164 in another module 13 in the same filler 12 may require that keys be only 512 bits long, but need not be escrowed. The cryptographic manager module 18 may require a key length limit of 512 bits, and require escrow also. Thus a superposition of policies 164 may use the most restrictive intersection of policy limitations.

An authority 152, thus certifies 166 or provides a signing operation 166 for a certificate 154 for a holder. Referring to FIG. 5, the certification authority 152a (the root certifier 152a) is an authority 152, to the CMC signature root 152b as a holder, both with respect to the certificate 154b.

Each certificate 154, is signed using a private key 156 of a certifying authority 152. For example, the certifiers 152a, 152b, 152e use private keys 156a, 156b, 156e, respectively, to sign the certificates 154b and 154e delivered to the CMC signature root 152b and server CA 152e, and certificate 154j forwarded by the key generation module 42.

The certificate 154b also includes a public key 160b. A public key 160, in general, is one half of a key pair including a private key 156. For example, the private 156a, 156b, 156c, 156d, 156e, 156f, 156g, 156h is the matched half associated with the public 160a, 160b, 160c, 160d, 160e, 160f, 160g, 160h. The key pair 156a, 160a, is associated with the root certifier 152a. Similarly, the private key 156b may be used by the CMC signature root 152b to certify 166d, 166e the certificates 154d, 154e with the signatures 162d, 162e. Thus, in turn, each of the public keys 160d, 160e, respectively, is the public key half of the pair that includes the private key 156d, 156e, respectively.

A holder, such as the module signature authority 152d or the server certification authority 152e may verify the validity of the public key 160b using the signature 162b and the public key 160a. Similarly, a processor entity may verify the validity of the certificates 154d, 154e, respectively, by recourse to the signature 162d, 162e, respectively and the publicly available public key 160b responsible.

Referring to FIGS. 5 and 6, generation of private/public key pairs 156, 160 and subsequent certification 166 may be represented by cascading certificates 154. For example, at the top or root of all certification authorities 152 may be a root certifier 152a. The root certifier 152a may generate a private 156a, and a public key 160a, as a key pair 156, 160.

The root certifier 152a need have no signature 162. The root certifier 152a in such circumstance must be "trusted". Another method, other than a digital signature 162 of a higher certifying authority 152, may typically be required for verifying the public key 160a of the root certifier 152a.

Only one root certifier 152a (RC 152a) is needed for the entire world. In one embodiment, the root certifier 152a may be an entity willing and able to credibly assume liability for the integrity of public keys 160, and the integrity of associated certificates 154. For example, an insurer, or a company known and trusted by the entire business world, may serve as a root certifier 152a. Such companies may include large, multinational insurance companies and banks. The root certifier 152a is functionally responsible to physically protect the secret key 156a. The root certifier 152a is also responsible to distribute the public key 160a.

The root certifier 152a may authorize private/public key pairs 156b, 160b to be created by the CMC signature root 152b. The integrity of the public key 160b, and the identity 158b of the CMC signature root may be certified by a digital signature 162b created by the root certifier 152a using the private key 156a.

Any subsequent entity, receiving a certificate 154 cascading from the CMC signature root 152b as a certifying authority 152, may verify the certificate 154. For example, the certificate 154b, and its contents (public key 160b, ID 158b, and signature 162b) may be verified using the signature 162b. The signature 162b may be created using the private key 156a. Therefore, the signature 162b can be verified using the public key 160a available to the entity to whom the authority of a certificate 154b is asserted as authentication.

The root certifier 152a may have its public key 160a embedded in the base executable 14. Alternatively, any method making the public key 160a securely available may be used. In this example, the base executable 14 or principal software product 14 may typically, be an operating system 14. The base executable 14, operating system 14 or base executable 14 may be thought of as including everything that arrives in the base executable associated with a newly purchased, generic, software package 14. This may sometimes be referred to as "the base executable 14."

As a practical approach, the CMC signature root 152b may be associated with, and the private key 156b be in the possession of, the "manufacturer." For example the manufacturer of a base executable 14, such as a network operating system 14 may be the holder of the private key 156b used to certify all public keys 160d and associated certificates 154d of the module signature authority 152.

As a practical matter, the highest level of public key 160 embedded in (or otherwise securely available to) a base executable 14 may be the signature root key 160b associated with the certificate 154b. An instantiation of the certificate 154t may be embedded in, or otherwise securely available to, the CMC loader 90. Thus, the loader 90 may verify against the manufacturer's public key 160b (available to the loader) the signature 162d in the certificate 154d effectively presented by the module 13. That is, one may think of the certificate 154d as being included in the cryptographic module 13 (engine 20) of FIG. 6 by a module vendor.

Thus, the loader 90 may verify that a vendor is authorized to produce the modules 13 under the policy 164d bound to the certificate 154d. However, the foregoing starts at the wrong end of the process. The signature 168 on the module 13 is present for verification of the module by the loader 90. The signature 168, encrypted using the private key 156h, may be verified by recourse to (e.g., decryption using) the public key 160h. The key 160h is presented in the certificate 154h, also available with the module 13.

In turn, the signature 162h on the certificate 154h, may be verified using the public key 160d. The key 160d corresponds to the private key 156d used to encrypt the signature 162h. The key 160d is available in the certificate 154d with the module 13. The certificate 154d and key 160d are verified by the signature 162d on the certificate 154d with the module. The signature 162d may be verified (e.g., such as by decryption or other means) using the public key 160b of the CMC signature root 152b. An instantiation of this key 160b is available to the loader 90 with the certificate 154d, as discussed above. By having the certificate 154d independently of the modules 13, the loader may thus verify each module 13 before loading into the filler 12 (CMC 12).

As an example, the CMC signature root 152b may be associated with the manufacturer of the base executable 14. The base executable 14 may be thought of as the principal software product 14, such as an operating system 14. By contrast, the CMC 12 may be thought of as a filler 12, a modularized segment that is required to be present within the base executable 14, but which may be modified, customized, limited, authorized, or the like, by a manufacturer for a class of customers or by a suitably authorized, third-party vendor of modules.

In the case of a base executable 14 that serves as a network operating system 14, such as Novell Netwareʋ, the manufacturer, (Novell, in this example) may be the CMC signature root 152b. Another example may be a third-party vendor of modules 13. A third party vendor of modules 13 may produce, for example, engine modules 20 for insertion into the CMC 12, but may be a value-added reseller of the base executable 14 adapted with such a cryptographic engine module 20 or other module 13.

For purposes of discussion, a manufacturer may be thought of as the maker of the base executable 14. A vendor or third party vendor may be thought of as the maker of modules 13 for inclusion in the CMC 12 (filler 12) portion of the base executable 14. A distributor, reseller, or third party reseller may be thought of as a seller of base executables 14 purchased from a manufacturer. The manufacturer may distribute and create modules 13. A vendor of modules 13 may be a distributor of the base executable 14, also.

Thus, a situation of great interest involves a manufacturer desiring to provide the base executable 14, while certifying a vendor's module products 13. The modules 13 may be integrated as part of the CMC 12 of the base executable 14 after the base executable 14 is shipped from the manufacturer. As discussed above, shipment of a base executable 14 in some standard configuration is desirable. In a preferred embodiment a base executable 14 shipped into a foreign country having import restrictions on cryptography, may provide a reliable method for enabling authorized cryptography exactly, while disabling all other potential uses of cryptography. Minimum modification, interfacing, and cost may be provided by an apparatus and method in accordance with the invention, with maximum assurance of authorization and control, all at a reasonable processing speed.

The CMC signature root 152b may be responsible for manufacturing and exporting the base executable 14 to customers (users) and third party resellers, and supporting software development kits (SDKs) to third party vendors. The manufacturer may be a maker of modules 13 also. Typically, the manufacturer may produce the null engine 48, at least.

The module signature authority 152d associated with the ID 158d may be that of the holder of a software development kit for modules 13. A policy 164d bound to the certificate 154d may be certified by the signature 162d of the CMC signature root's 152b private key 156b.

The policy 164d may be enforced by the manager module 42 and embodies the limits on the use and strength of keys 156d. For example, the length (strength) of keys 156 useable under the policy 164d and the types of modules 13 may be controlled by statute in each country of importation for the base executable 14.

A loader 90 from the manufacturer may control linking of modules 13. Thus, a third party, including a module vendor cannot change the limitations inherent in a key, the policy, or the like.

A policy 164, in general, may define the maximum strength of the key. A module signature authority 152d, holding a particular authorized software development kit may create different types of keys 156 as long as each is within the bounds of the policy 164*d*. The module signature authority 152*d* may also then certify a module-signing key pair 152*h* authority for each module type produced and sold. Certificate 154*h*, so signed using the private key 156*d*, may provide a key 156*h* to sign each module 13, such as the cryptographic modules 13 exemplified by the engine 20 of FIG. 4. Meanwhile a module signature authority 152*d* may certify embedded keys 160*h* and associated certificates 154*h* automatically by using the software development kit.

Note that a chain or cascade of certificates 154*d*, 154*h* may be used in a module in order to have the signatures 162 for the loader 90 to verify. The loader 90 may then verify the keys 160*d*, 160*h* using signatures 162*d*, 162*h* of the certificates 154*d*, 154*h* to authorize the loading of the module 20 (see FIG. 6).

Verification may be necessary in order for the loader to have the certified keys 160*d*, 160*h*, 160*b* necessary for verifying the module signature 168. That is, a vendor may use a software development kit containing a module signature authority 152*d* to create some number of module signing key pairs 152*h*.

The private keys 156*h* may be used to sign 166*m* with a signature 168 every module 13 created. Note that the modules 16, 10, 42 in the base executable 14 of FIG. 6 may all be thought of generically as modules 13 as in FIG. 1. The certificate hierarchy 154*h*, 154*d*, 154*b* of the module 13 may all be verified by the loader 90 using the appropriate public keys 160*d*, 160*b*, to verify the respective signatures 162*h*, 162*d* from the certificates 154*h*, 154*d*.

The server certifying authority 152*e* (CA 152*e*) may be produced by the manufacturer based on a CMC signature root 152. The server certificate authority 152*e* may be embodied in the server 60 (see FIGS. 2,6) on a server-by-server basis. Thus, a server 60 may generate keys 156*j* or pairs as shown in FIG. 6. Thus, the server 60 is able to certify by a key generation manager 42 keys 160 generated by that server 60.

A private key 156 may preferably be unique to an individual server 60 so that there is no need to provide a globally exposed private key 156. The private key 156*e* of the server certificate authority 152*e* of FIG. 6 may be the only private key 156 embedded in a base executable 14 or operating system 14 hosted by a server 60. This may be very important for providing signatures 162*j* for certifying 166*j* other keys 160*j* and IDs 158*j* signatures 162.

As a practical matter, by embedding is meant alternate methods that may be implemented in the server 60 in another manner well adapted to dynamic loading. For example, the private key 156*e* may not necessarily need to be embedded, as in the illustrated example. Rather, the key 156*e* may simply be "securely available," such as by reading from a secure hardware device. Thus, a key 156*e* may be securely available to the CMC 12 in the server 60 and function as well as if actually embedded. The expression embedded should be interpreted broadly enough to include this "securely available" approach. This is particularly true since dynamic loading in combination with cryptographic techniques herein for verification make such methods readily tractable.

In general, a private key 156 may be used to produce certifying signatures 162. A key 156 may also be used to decrypt data received when it has been encrypted using a corresponding public key 160 to ensure privacy.

Both keys 156, 160 may be necessary for both privacy and integrity, but they are used at opposite ends of a communication. That is, for example, the CMC signature root 152*b* may use the public key 160 of the module signature authority 152*d* to assure privacy of communication to the module signature authority 152*d*. The module signature authority 152*d*, may use the public key 160*b* of the CMC signature root 152*b*. Each 152*b*, 152*d* may use its own private key 156*b*, 156*d* to decrypt received messages. Integrity may be verified by a signature 162 authored using an appropriate private key 156*b*, 156*d*. Meanwhile, authenticity of communications, such as a signature 162*d*, created using a private key 156*b*, may be verified by an entity using the corresponding, published, public key 160*b*.

As a matter of good cryptographic practice, integrity and confidentiality (privacy) may rely on separate keys. A module 13 may employ a plurality of private/public key pairs 156/160. One pair may be used for channel confidentiality. A separate and distinct pair may be used for channel integrity.

The certificates 154 in the base executable 14, for example in the module 13, and loader 90 illustrate authentication of the cascade of certificates. Initially, the modules 13 of FIG. 6 are signed by the signature 168 created with the private key 156*h*.

The public key 160*h* may be used to verify the signature 168. References to decryption of signatures 168 mean verification, which requires some amount of decryption.

The authenticity of the public key 160*h* is assured by the signature 162*h* on the certificate 154*h*. The signature 162*h* is verified using the public key 160*d* in the certificate 154*d* available.

The authenticity of the public key 160*d* is assured by the signature 162*d* on the certificate 154*d*. The signature 162*d* is verified using the public key 160*b* in the certificate 154*b* available.

This illustrates the practical limit to authentication. The following is not separately illustrated in the architecture, but could be implemented. The authenticity of the public key 160*b* could be assured by the signature 162*b* by obtaining the certificate 154*b*. The signature 162*b* would have to be verified using the public key 160*a* in the certificate 154*a* available. Note that some other mechanism must be used to verify the certificate 154*a*.

A server may generate keys for cryptographic operations. For example, a separate set of keys 156*j* may exist for each client 58 on the network 56.

Asymmetric systems are more computationally expensive than symmetric systems. The key length used in asymmetric systems is typically much longer than that for symmetric systems. (e.g., asymmetric keys may be 1–2 k bits long, versus 40, 64, or 128 bits for typical symmetric keys). In cryptographic protection schemes, an asymmetric algorithm may be used to protect a symmetric key that will be distributed to a client 58 encrypted using the client's public key 160 and decrypted by the client's corresponding private key 156. A shared secret key may be used for shared symmetric key communication in a network 56. Thus, the server CA private key 156*e* may be used to generate a signature certifying other public/private key pairs 160, 156. That pair 156, 160 may be used to certify another pair or to distribute a symmetric key pair.

A certificate 154 is needed for a public key 160, and must be signed (162) using the corresponding private key 156. A private key 156, for example, is used to certify any public key 160 created in the key generation module 42 of FIG. 6. That is, the key generation module 42 may generate a key pair 156, 160; in which the server CA private key 156*e* is used to sign the certificate 154*j* created by the key generation module for the cryptographic libraries.

The server CA private key 156 may be used to sign all certificates 154 (with included public key 160) generated by the CMC filler 12 in the base executable 14 of operating system 14 hosted on the server 62.

A server key (not shown), which may be symmetric, may be generated by the key generation module 42 and used for key wrapping. All keys that should be kept secret may be wrapped for being transmitted or stored secretly outside of the CMC 12, such as in a cryptographic library 36.

Certain of the attributes of a key 156 (algorithm, archive, type, etc.) may be wrapped along with the key 156 before being passed outside of the CMC 12. Thus a private half of an asymmetric key pair, or a symmetric, secret key should be wrapped preceding any export or output from the CMC 12.

The libraries 16 may be (typically must be) application-specific, and anything transmitted to them may be considered to be outside of the control of the CMC 12 once it is transmitted to the library 16.

Escrow is controlled by a manager 18 such as the key generation manager 42, a cryptographic manager 18. In any case, every key 156*j* generated should be saved throughout its useful life. A key 156*j* may be saved, typically, in an encrypted format in a secure environment called a key archive 170. The archived key 156*j* may first be encrypted, and the key 160 to that encryption is the escrow public key 160*k*. The corresponding public key 160j is also archived, although it may be publicly available.

The escrow authority 152*f* may be an entity generating a public/private key pair 160,156 for each server 60 in order to encrypt (privacy protect) private keys 156 before archival. Thus, the escrow authority 152*f* may have a private key 156*f* unique to itself, which is used to sign 162*k* the certificates 154*k* for all of those public/private key pairs 156k, 160*k*. The escrow authority 152*f* may receive its private/public key pair 156*f*, 160*f* from a key escrow root 152*c*. The key escrow root key 156*c* may certify the key 160*f*held by the escrow authority 152*f*. The manufacturer of the base executable 14, (Novell, in the example above, may be (i.e. control) the key escrow root 152*c*.

The certificate 154*c* held by the key escrow root 152*c* may itself be signed by the root certifier 152*a* certifying the public key pair 160*c* of the key escrow root 152*c*. Thus, the key escrow path (certifications 166, cascade) of certificates 154 and keys 156, 160 may have its source in the root certifier 152*a*, just as the CMC signature root 152*b* does. Thus this single root public key 160*a* can serve as the basis for validation of all other certificates.

An escrow authority 152*f* may hold the private key 156*k* to the archive holding the encrypted, escrowed keys 156. The archive 170 may actually be inside the server 60. Thus, the holder of the base executable 14 has all the encrypted keys 156.

However, a government or some such agency may require certain keys of the escrow authority 152*f*. A manufacturer, such as Novell, the operating system manufacturer, in the example above, could also serve this function as well as being the key escrow root 152*c*. This may be advantageous for the same reasons that a manufacturer would be the signature root 152*b*. The escrow authority 152*f* may give to the agent the escrow private key 156*k* for the specific server. This may be the private half 156*k* of an escrow key 156 that the keys 156 in question were encrypted in for archiving. The government may then go to the user of the server 60 to get access to the archive 170 in the server 60 of the owner of all the keys 156*j*.

Some governments may want to be the escrow authority 152*f* for all escrow keys. The government may unlock the key archive 170 whenever desired. In certain countries, the key archive 170 may be in possession of a trusted third party or the government. For example, the key generation module 42 may need to create keys 156*j*, encrypt them, and send them as data to a trusted third party acting for the government to control the archive 170.

From the above discussion, it will be appreciated that the present invention provides controlled modular cryptography in an executable designed to be embedded within another executable such as a network operating system, or the like. Cryptographic capability is controlled by a manager module operating according to a policy limiting the capability and access of other modules, particularly that of the cryptographic engine. Thus, a system 14 (a base executable 14) may be provided having nearly all of the capabilities of the "filler" 12 intact. A very limited interface between a filler 12 and its internal engine selection 20 provides for examination of engines 20 by regulatory authority. Moreover, the restricted interfaces 30, 32 between the engines 20 and the remaining modules 13 of the filler 12 present great difficulty to those who would modify, circumvent, or replace any portion of the filler 12 (CMC 12) in an attempt to alter its capabilities. Meanwhile, asymmetric key technology provides for enforcement of all controls, thus providing privacy and integrity for all communications, operations, exchanging of keys, and the like.

Flexible Policy Considerations

Referring to FIG. 2, a system 10 in accordance with the invention may include a flexible policy apparatus 200 implementing selected modules 13. In one embodiment, a manager module 202 may contain an embedded policy 204. A policy 204 may correspond to a key usage policy, key generation policy, escrow policy, escrow policy engine, filter policy, filter policy engine, certification policy, or the like.

In one presently preferred embodiment, the policy 204 may be located remote from the layer 18 in which the manager modules 42, 44, 46 are associated with, and be associated instead within the engine layer 20. In a further embodiment, other manager modules 206 may also be present. The manager modules 202, 206 may each communicate directly with the library layer 16. The manager modules 202, 206 may also communicate with or through other manager modules 202, 206 of FIG. 7. Thus, for instance, while the manager module 206 may rely upon a policy 208, it is not necessary that one policy 208 be integrally embedded within the manager module 206.

The manager module 206 may communicate 310 with the manager module 202, and may communicate 212 also or alternatively communicate with the library layer 16. In one embodiment, the manager module 202 communicates 214 directly with the library layer 16, while in another embodiment, the manager 206 communicates with the library layer 16 only through the manager 202.in the manager layer 18. This arrangement may remove the need for an embedded policy 204 governing the manager module 202.

In an embodiment of the invention, a policy engine 220 is located within the engine layer 20 and includes executables and data for establishing control attributes relied upon by modules 13 in the management layer 18. For example, a policy engine 220 may create or rely upon a policy 222. A call 224 may communicate 224 between the manager layer 18 and the policy engine 220. Alternatively, calls 224, 226 may be directed between modules 13 in the engine layer 20 and modules 13 in the manager layer 18, as well as modules 13 within the support layer 22. However, modules 13 within the engine layer 20 may also communicate with one another.

In one embodiment, a policy 230 may include no executables, and merely contain data relied upon and processed by a manager module 42, 44, 46, 202, 206, or the like. Calls 232, 234 may directly communicate with or operate upon the policy 230, rather than passing through or relying upon any engine 220 in the engine layer 20. Thus, an XMGR 202, 206 may be relied upon by a module 13 in the management layer 18 to implement a policy 230. Policies 230 may be linked to other policies 222. Moreover, executables within a policy engine 220 may be used to create, verify, sign, reconcile, and otherwise modify the attributes of various policies 222, 230. The policies 230 as with the other modules 13, may be dynamically linked and authenticated independent of the others of the modules 13. This minimizes the amount of code in any one module for efficiency and reduced exposure. It also increases flexibility of the policies 230 or other modules 13 may be modified independent of the other modules and the entire CMC 12.

Figure 8:
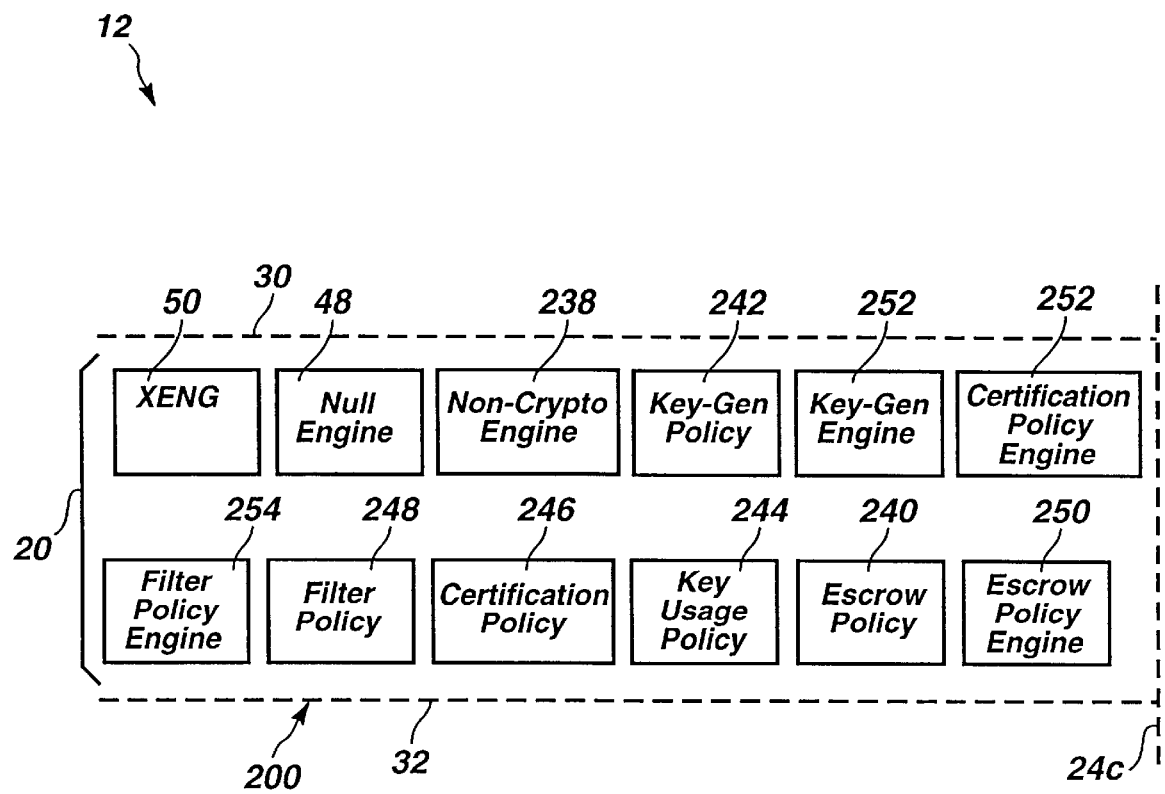
FIG. 8, is a schematic block diagram illustrated in greater detail an engine layer of the architecture of FIG. 7.

Referring to FIG. 8, various types of modules 13 (of FIG. 1) in the engine layer 20 are illustrated. The modules 13 in the engine layer 20 are typically engines and are not display in any particular order to illustrate that the engines are independent modules 13 and need not be linked or otherwise related to each other. For example, a null engine 48 may be provided to operate in the absence or non-intentional non-use of a cryptographic engine 50. A cryptographic engine 238 may also be provided, the non-cryptographic engine 238 may provide specific functionality other than cryptography or merely maintaining links. For example an individual, or organization may not need or desire cryptographic capability. Nevertheless, certain filtering and watchdog functions over incoming and outgoing communications may be desirable. Accordingly, policies 230 (of FIG. 7) may be put in place that have no cryptographic capacity or reliance.

An escrow policy 240 may also be implemented as a separate module 13 and located at a lower layer such as in the engine layer 20 in subjugation to the manager layer 18 is an escrow policy 240. Escrow policies, as discussed above, may be implemented independent from an individual manager 202, 206. Nevertheless, a manager module 42, 44, 46, 202, 206 may be responsible for controlling, establishing, enforcing, and the like, an escrow policy 240. Escrow policies 240 may control a substantial number of variables affecting accessibility to cryptographic features.

A key generation policy 242 may be implemented in the engine layer 20, as may be a key usage policy 244. In certain embodiments, a key generation policy 242 may be relied upon by a key generation manager 42 in determining when, how, and to whom keys may be provided.

As a practical matter, a certification policy 246 may be extremely useful in an apparatus 10 in accordance with the invention. In certain embodiments, certificates 154 may be defined, provided with controlling data, and the like, in accordance with a certification policy 246 that may be loaded into the engine layer 20.

In an apparatus 10 in accordance with the invention, dismemberment of conventional functionalities into individual modules 13 dynamically linked by a loader 90 may be extremely helpful. For example, a filter policy 248 may be thought of as a policy 248 adapted to use no cryptography, but to provide a similar service with respect to non-cryptographic functionality. Accordingly, the filter policy 248 may be generalized for use and may be thought of as an abstraction for any policy 230.

An escrow policy engine 250 may be provided for containing executables associated with an escrow policy 240. The escrow policy engine 250 may contain all the data that an escrow policy 240 would contain. Nevertheless, an escrow policy engine 250 may contain exclusively executables. On the other hand, any amount of executable and operational data structures may be implemented in an escrow policy engine 250. As a practical matter, an escrow policy engine 250 may be a software object 250.

An apparatus 10 may be dynamically linked together as a variety of components 16, 18, 20, 22, separated from one another by cryptographically-imposed barriers 28, 30, 32. Similarly, a key generation engine 252 may be located within the engine layer 20. As a practical matter, a key generation engine may be embedded in a manager module 202, 206. Nevertheless, flexibility of key generation capacity may be more easily achieved using the general purpose cryptographically-implemented apparatus 10 developed to provide an infrastructure as illustrated. The apparatus 10 is thus effective to implement such various policies 242, 244, 246, 248, and other modules 13 with extreme flexibility, yet strict controls.

In general, a filter policy engine 254 may be thought of as an object or other combination of executables with related data structures. In one embodiment, a filter policy engine 254 may be used to make traffic decision regarding incoming or outgoing features, data, capacities, entities, and the like.

The flexibility provisions of the present invention may extend beyond merely modularizing and subjugating the policies 222, 230 and policy engines 220. Thus, for example, other individual modules 13 might be contained within any policy 240–248 and be modularized, nested, dynamically linked, and cryptographically controlled.

Figure 9:
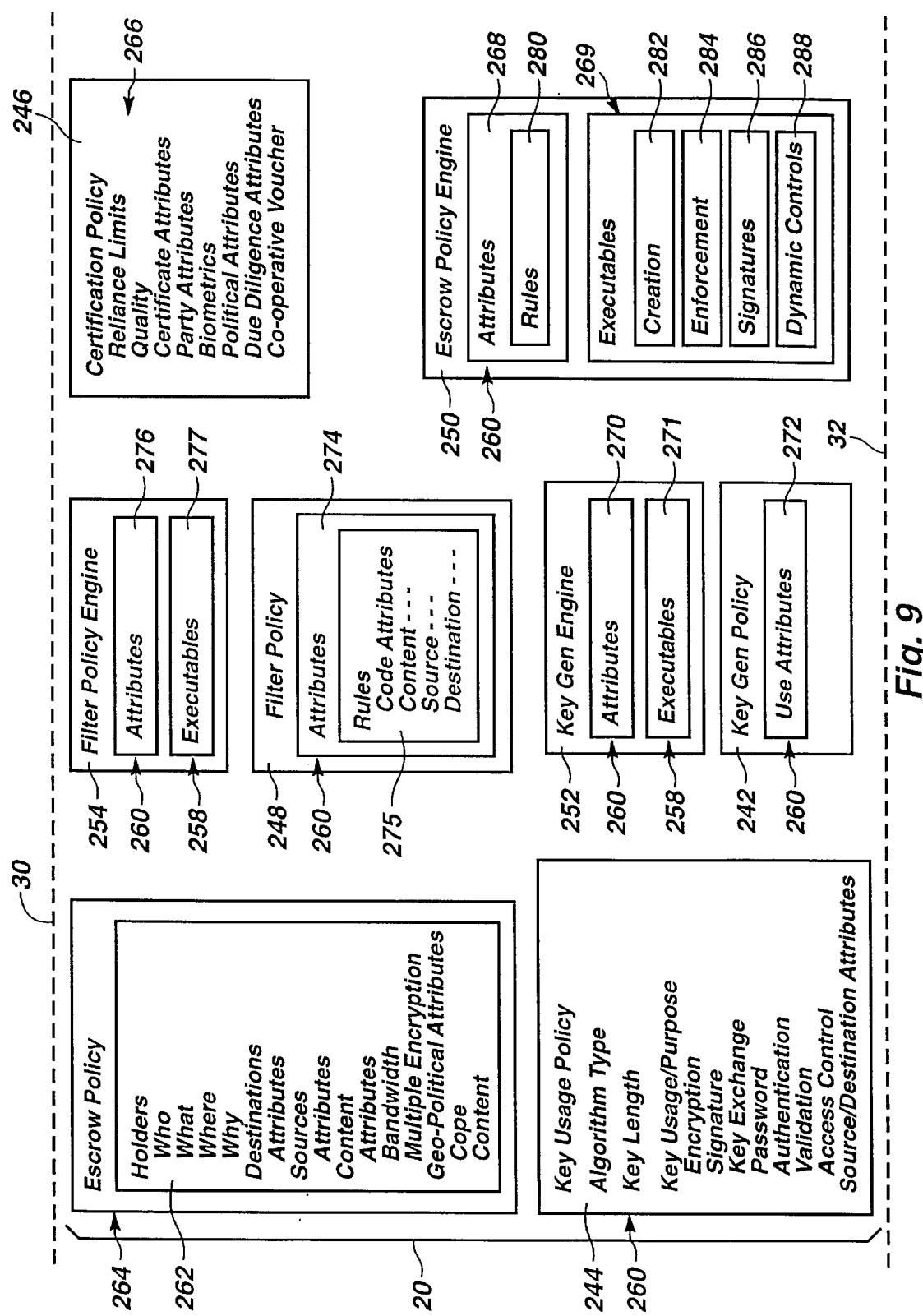
FIG. 9 is a schematic block diagram illustrating in greater detail modules within the engine layer of FIG. 8.

Referring to FIG. 9, shown therein are possible modules 13 for inclusion within an engine layer 20 or other layer subjugated to a manager layer 18, together with exemplary contents of those modules 13. For instance, the attributes 260 may be modularized and contain the particulars of a policy 230. A policy 230 may also contain modularized executables 258 relying on attributes 260 within the policy engine 220.

Alternatively, a policy engine 220 may provide executables 258 effective to interact with, create, abide by, enforce, and the like certain policies 230 under the direction of a module 13 in the management layer 18.

Particular attributes 260 for one embodiment of an escrow policy 240 are illustrated in FIG. 9 these may include contents, and geo-political considerations for particular holders of keys 156 and certificates 154, as well as destinations, sources, keys 156 and certificates 154. These attributes might also be separately modularized and optionally governed by a manager module 18.

Particular attributes 262 regarding holders of keys 156 and certificates 154 (privileges) might include particulars pertaining to who may hold the privileges 154, 156; what form the privileges 154, 156, may be in; where the privileges 154, 156 may be used, and for what purposes.

Source information or destination information may be included as attributes to engage or control cryptographic features available from the apparatus 10. Attributes 262 associated with content may include frequencies of transmission, band width, and the like that may provide covert channels for communication. For example, a file that is sufficiently large and dense may be modulated ever-so slightly to provide a valuable but covert channel. Consequently, formats, carrier signals and the like may be governed by a policy 230, 240, Geo-political attributes, might govern the use of certain cryptographic engines 50, e.g., in countries with legal restrictions on such engines 50. Additionally, escrow requirements also very among differing countries.

In another embodiment, multiple encryption may be forbidden to certain entities in accordance with a policy 240. As a practical matter, the escrow policy 240 is preferably effective to instruct a module 13 in the management layer 18 how to provide escrow functionality in accordance with laws and regulations effecting an entity using the apparatus 10.

Referring to FIG. 9, illustrated attributes 260 for one embodiment of a key usage policy 244 may include algorithm types, key lengths, and key usages and purposes available. The particular attributes 260 of the key usage policy 244 may include limitations on usage for encryptions, signatures, key exchange, key words, pass words, certain authentications, validation, access control, and the like. Of course the key usage policy 244 may require a variety of other types of attributes 260 to be associated with keys 156.

The certificates 154 may be defined, controlled, evaluated, implemented, and the like in accordance with certification policy attributes 266, which may be associated within a certification policy 246. Examples of particular attributes 266 pf a certification policy include financial reliance limits, and quality standards. Thus, trusted systems evaluation class, and other measures of reliability may be implemented at will within certification policies 266 by implementing the methods and apparatus in accordance with the invention.

Certification policy attributes may also include certificate attributes deemed useful and pertinent in evaluating the reliability of a certificate 154. Party attributes, might include characteristics of parties engaging in a communication or transaction and other certification policy attributes 266 might be defined in virtually any detail from geographical, political, financial, or even by biometric considerations. Biometric considerations may include thumb prints, or other physically identifying characteristics that can be used to form a rational basis for a certification policy 246.

One immediate concern is political attributes throughout the world. Terrorists in one country may be responsible for instabilities causing entities from other countries to limit cryptographic capabilities sent thereto, received therefrom, or implemented in any way at that location. In certain environments, a degree of diligence must be exercised in evaluating trustworthiness of an organization. Certification policy attributes may include any or every consideration from personal integrity, financial status, physical plant, sensitivity of information, and the like that may be evaluated in determining the trustworthiness or other reliability factors of certificates to be provided to or provided by such an entity. Likewise, as a co-signer on a loan, an individual who operates as a cooperative voucher for another may be identified as a particular attribute 266 in a certification policy 246.

The number of attributes 260 that may be used in the CMC 12 of the invention is effectively limitless. As infrastructure is developed, new individual attributes 260 and executables 258 may be added under the modularized scheme of the present invention used to implement a host of policies 230 and policy engines 220. Under this scheme, a high degree of integration need not be required or even desired at the manager level 18 or through the entire modules 13.

A certification policy engine 252b may also be present. Likewise, any characteristics of others of the attributes 260 that are to be implemented in a policy 230 may also be defined implemented, and enforced by a policy engine 220 typically under the direction of a manager 42, 44, 46.

An escrow policy engine 250 is illustrated by the way of example in FIG. 9 and may include modularized attributes, as well as modularized executables 269. As a practical matter, all attributes 268 may be thought of as defining characteristics of entities that would be governed by policies 240, 242, 244, 246, 248. Accordingly, executables 269 may merely control, enforce, or provide other operations necessary to implement rules 280. The executables 269 and a policy engine 250 may obviate the need for a module 13 in the management layer 18 to be pre-programmed in order to implement rules 280 in attributes 268 in a policy 230, 250.

A key generation engine 252 is also shown by way of example in FIG. 9 and may include attributes 270 and executables 271, as with the other engines 220. Similarly, the dichotomy between the engine 220 and the policy 230 may be implemented in a separate key generation engine 252, and key generation policy 242. Thus, the attributes 270 may be exported as use attributes 272 of a key generation policy 242.

The separation of the modules 13 in the management layer 18 and the policies 220, 230 may be further extended to a separation of any or all of the engines 252 from any policies 242 that the engine 252 may create under the direction of the management layer 18.

A filter policy engine 254, shown in FIG. 9 by way of example, may be thought of as a generalized engine 220. As a matter of utility, a filter policy engine 254 may use attributes 276 and executables 278 to implement any type of a filter. The attributes 276 and executables 277 may also be modularized in certain embodiments, the region of origin of code or content, may be limited. Regionality may be defined geographically, by spectrum position, by transmission frequency, and the like. Moreover, the region of origin and destination of content of messages may be controlled. For many years, the Internet and the broadcast media have wrestled with the difficulties of implementing proper controls at individual sites of received broadcasts.

The age, gender, or any other attribute 276 may be used to determine a suitable manner for filtering by a filter policy engine 254 or management engine 46 implementing a filter. Thus, the attributes 274 of a filter policy engine 254 may be a subset of the attributes 276, may be created by the executables 277 in leu of the attributes 276, or may have some other relationship to the filter policy engine 254. In general, filter policy attributes 274 may include rules as to code, content, source, destination, and the like desired.

An escrow policy engine 250 is shown by way of example in FIG. 9 and may include rules 280 within or attributes 268. Similarly, executables 269 may be contained therein and may include creation 282, enforcement 284, signing 286, and dynamically controls 288 of an escrow policy 240. As can be seen from the above discussion a general purpose infrastructure implemented in the apparatus of FIGS. 1–9 utilizes dynamic linking and control of modules 13 to allow management modules 18 to access policy engines 220 or policies 230 without the need for integrating the policy engines 220 or the policy 230 therein.

Accordingly, the policy engine 220 or policies 230 may themselves be independently dynamically linked within the CMC 12 of the present invention. The ability to flexibly escrow or establish other policies 230, including key generation, key usage, escrow of keys, and all of the implementation schemes associated therewith, may thus be implemented in a flexible, yet secure manner with the infrastructure of an apparatus 10 in accordance with the invention.

Modular Authentication and Binding Library Extensions (MABLE)

Figure 10:
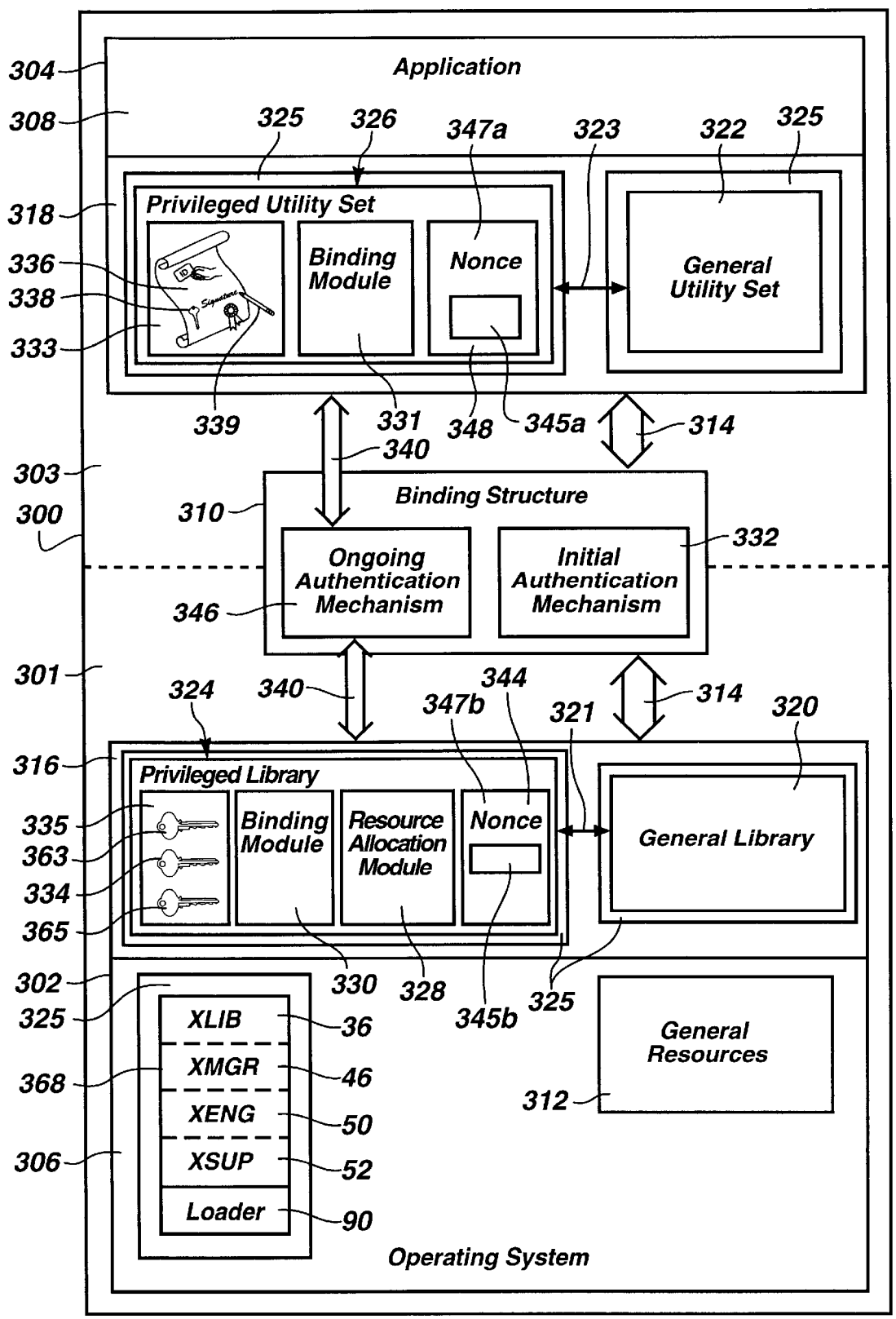
FIG. 10 is a schematic block diagram of modules in a computer system for effecting module authentication and binding library extensions of the present invention.

Referring now to FIGS. 10 through 13, shown therein are an apparatus, system, and method for effecting secure communications and resource sharing between independent, executable entities. Shown in FIG. 10 is a computer system 300, which is shown logically divided into two types of executable entities. At the bottom of FIG. 10 reside untrusted entities 301. At the top of FIG. 10 reside trusted entities 303.

In the illustrated embodiment, given as one example of a trusted entity 301 is a base executable entity 302 in the form of a network operating system 306, and given as one example of an untrusted executable entity 304 is an authenticating executable entity 304 in the form of an application 308. The base executable entity 302 could also be a JAVA virtual machine or some other type of executable entity.

The application 304 and the operating system 306 may exist on a single node 58 within a single network 56, on separate nodes 58 within a single network 56, or on multiple networks 56. The application 304 and the operating system 306 are given as representative examples of independent executable entities 302, 304. Accordingly, the application 304 and operating system 306 could be separate functions or procedures within a single program or could constitute or be located within separately compiled programs.

The application 304 and operating system 306 may each reside within system memory 72, 82, 84 and operate upon system processors 70. Also, the system memory 72, 82, 84 and system processors 70 need not be located within a single node 58, but could also be located within separate host computers 60, could be located at separate nodes 58, and could communicate directly or over a distance, such as over the network 66, which might comprise the Internet.

As used and claimed herein, a computer processor generally indicates one or more processors such as the CPU processors 70. Thus, the computer processor may be a plurality of CPU processors 12 operating within separate nodes 58 and in communication with each other through a communications network 56. A computer memory generally indicates a memory such as the system memory 72, 82, 84, and once again, the computer memory need not be a single memory device, but could comprise a plurality of memory devices 72, 82, 84 operating within a single computer, could comprise a plurality of memories 72, 82, 84 operating within separate nodes 58 within a communications network 56, or could comprise a virtual memory within a computer or network.

In the depicted embodiment, the trusted executable entity 303, 304, 308 is configured to authenticate the identity, origin, and integrity of the untrusted executable entity 301, 302, 306. In order to do so, a binding structure 310 is provided as shown in the depicted embodiment. The binding structure 310 may also be used to authenticate the application 308 to the operating system 306 as an alternative to or in addition to authenticating the operating system 306 to the application 308.

The individual components of the binding structure 310 may be employed within the application 304 and/or the operating system 306. The binding structure 310 with or without the help of a loader 90 may generate an initial relational linking or binding allowing a general communication link 314 and/or a privileged communication link 340 to be established between the application 308 and the operating system 306.

Preferably, at least the privileged communication link is established only after an authentication of the operating system 306 by the application 308. The general communication link 314 in one embodiment allows the application 308 to access general resources 312 within the operating system 306, and may or may not require authentication prior to being established.

The operating system 306 and the application 308 preferably communicate through a modular interface system, which in the depicted embodiment includes a lower interface 316 within the operating system 306 and an upper interface 318 within the application 308. Within the lower interface 316 may be located a general library 320, which in the depicted embodiment communicates with a general utility set 322 in the upper interface 318 The general library 320 in one embodiment comprises utility functions to service requests from the general utility set 322, and controls access to the general resources 312. The general library 320 is preferably provided in modular form and may be separately compiled or assembled from the operating system 306, and may be dynamically linked with the operating system 306.

The general utility set 322 is typically a standard group of procedures and commands for accessing the general library 320 and utilizing the general resources 312, which may comprise system input and output (I/O) equipment, directory services, and the like. In one embodiment, the general utility set is distributed as a modular software development kit for use in developing utilities and applications to complement the operating system 306 or other authenticated executable entity 302.

Also shown in the depicted embodiment of FIG. 10 is a privileged library 324. The privileged library 324 is used for privileged communications through a privileged communications link 340 with a privileged utility set 326. Privileged communications are, in one embodiment, communications which involve privileged resources 368.

The privileged resources 368 may comprise cryptographic services and may be provided from the Xeng 50 through the XLib 36 in the manner discussed above. The privileged library 324 may be statically linked with the general library 320, while the privileged utility set 326 may be statically linked with the general utility set 322. Binding modules 330, 331 are used to help establish the communication links 314, 340.

In one manner of implementing the present invention, one or more of the general library 320, the general utility set 322, the privileged library 324, and the privileged utility set 326 may be provided in modular form and optionally dynamically linked and loaded into slots 325 in the operating system 306 or application 308, respectively, using one or more loaders 90 in the manner discussed above.

Furthermore, the general library 320 and the privileged library 324 may be a single module, or may be separate modules independently or collectively integrated into the operating system and concurrently compiled or assembled with the operating system 306. The same is true for the privileged utility set 326 and the general utility set 322.

In this manner, the loaders 90 may be used to assure that the general library 320, the general utility set 322, the privileged library 324, and the privileged utility set 326 are of an intended identity, origin, and integrity, while maintaining flexibility, as discussed above.

The general communication link 314 is preferably utilized for general communications, which are those communications that do not utilize privileged resources 368, and consequently, may not require authentication. Thus, the application 308 may allow itself, or be allowed by the operating system 306, to effect general communications through the general communications link 314, absent authentication, but to not effect privileged communications through the privileged communications link 340 without authentication. Alternatively, all communications 340, 314 could require authentication through the binding structure 310.

To provide for dynamic authentication under the present invention, an initial authentication mechanism 332 is provided and shown within the binding structure 310 of FIG. 10. The initial authentication mechanism may, as stated, be used to authenticate the operating system 306 or other executable entity 302 to the application 303 or other executable entity 304 only prior to privileged communications. Nevertheless, it is preferred that the initial authentication mechanism 332 be employed prior to any interaction (other than the authentication itself) between the operating system 306 or other executable entity 302 and the application 308 or other executable entity 304.

In the depicted embodiment, the initial authentication mechanism 332 involves the use of a certifying authority key pair 334, 338. A certifying authority private key 334 may be stored within a private key location 335 within the privileged library 324. Nevertheless, the privileged library 324 need only have access to or "hold" the certifying authority private key 334. Accordingly, the private key location 335 may be merely a data structure such as a pointer indicating a location of the certifying authority private key 334.

In one embodiment, the certifying authority private key 334 is stored with the Xengine 50, which obfuscates the certifying authority private key 334 by distributing the private key 334 throughout operational or dummy code. This obfuscation may be done by controlling the distribution of this private key through cryptographic processes, by embodiment of this private key in executable code that is similarly distributed, or by a combination of both. The certifying authority private key 334 can also be partially or completely stored or hidden within hardware.

In the depicted embodiment, a certifying authority certificate 336 is stored within a certifying authority certificate location 333 within the privileged utility set 326. Nevertheless, as with the certifying authority private key 334, the certifying authority certificate location 333 could be a pointer or other data structure for accessing the certifying authority certificate 336.

The certifying authority certificate 336 preferably contains a certifying authority public key 338 and has a digital signature 339 that is self-signed with the certifying authority private key 334. The certifying authority public key 339 is preferably used by the initial authentication mechanism 332 as employed by the privileged library 324 and the privileged utility set 326 to effect an initial authentication in a manner that will be described in greater detail below.

Preferably, the certifying authority certificate 336 and other certificate 358, 360 that may be used as part of the binding structure 310 include a set of standard information. This standard information preferably comprises a key type, a public key, a format identifier, a general identifier, an expiration date, explicit security attributes for quality and identity, and a digital signature authenticating the standard information.

The certificates 336, 358, 360 may be of a proprietary format. Alternatively, the certificates 336, 358, 360 may be in a standard format such as the X.509, version 3 format, with a security attribute extension for key quality, certification quality, and enterprise ID.

In order to maintain the integrity of on-going interactions between the application 308 and the operating system 306 or other executable entity 302, 304, an on-going authentication mechanism 346 may be used. In the depicted embodiment of FIG. 10, the on-going authentication mechanism 346 is part of the binding structure 310. Nevertheless, the on-going authentication mechanism 346 may be distributed throughout other components such as the privileged library 324, the privileged utility set 326, the general library 320, the general utility set 322, the privileged resources 368, the binding modules 330, 331, and the upper and lower interfaces 318, 316.

The binding modules 330, 331 cooperate to form a communication link between the application 308 and the operating system 306, effectively "binding" them together in intercommunication. Such a binding generally occurs after an initial authentication, as will be discussed below.

A dynamic state variable in the form of a nonce construct 344 may be used as part of the on-going authentication mechanism 346. Identical copies of the nonce construct 344 are preferably maintained and stored within the privileged utility set 326 and the privileged library 324. Thus, a location 347b is shown within the privileged library 324 for storing through suitable data structures the nonce construct 344. An identical copy of the nonce construct 344 is stored within a location 347a within the privileged utility set 326.

Preferably, the nonce construct 344 is a time-varying and incidence-varying state variable and is passed between the privileged library 324 and the privileged utility set 326 during successive interactions between the operating system 306 and the application 308 or other executable entities 302, 304. Synchronization and verification of the nonce construct 344, with optional digital signatures and mathematical manipulation or cryptographic obfuscation, may be used to effect the on-going authentication mechanism in a manner that will be described in greater detail below.

Figure 11:
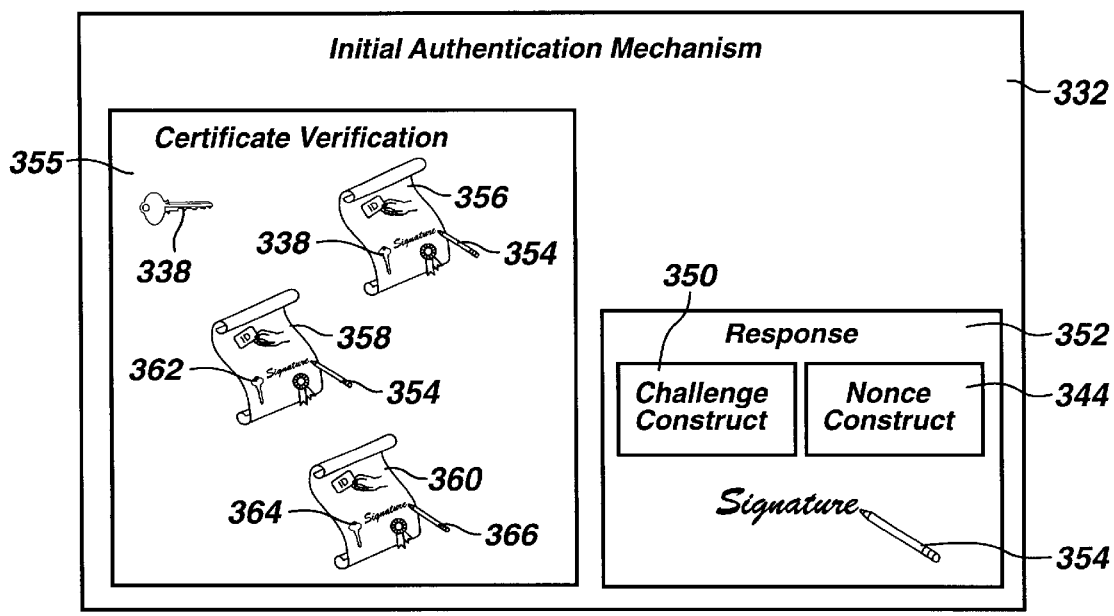
FIG. 11 is a schematic block diagram of an initial authentication mechanism of the computer system of FIG. 10.

FIG. 11 is a more detailed representation of one embodiment of an initial authentication mechanism 332. In the embodiment of FIG. 11, the application 308, when wishing to initially authenticate the operating system 306 for later communications or other interactions, first generates a challenge construct 350. The challenge construct 350 may be a nonce, one example of which is a 128 bit, time-varying, pseudo-random challenge nonce involving a hashing function.

The challenge construct 350 is passed to the operating system 306, which in response generates a response construct 352. The response construct 352 may include the challenge construct 350 and the nonce construct 344, and be signed with a digital signature 354. Preferably, the digital signature is signed with the certifying authority private key 334 and authenticated with the use of the public key 338 that is associated with the certifying authority certificate 336 held by the privileged utility set 326.

In addition, a chain of certificates 356, 358, and 360 may also be used as part of the initial authentication mechanism 332. Preferably, one or more of the certificates 356, 358, 360 are passed from the privileged library 324 to the privileged utility set 326 in response to the receipt of the challenge construct 350 by the privileged library 324.

The chain of certificates 356, 358, 360 are seen in FIG. 11 within a certificate verification module 355 to illustrate the mechanism by which the application 304 verifies the certificates 356, 358, 360 after receiving them from the operating system 306. In the depicted embodiment, the chain of certificates 356, 358, 360 include a master certifying authority (MCA) certificate 356 which may be the same as the certifying authority certificate 336, a master release-time key (MRK) certificate 358, and a master run-time key (MRT) certificate 360. Of course, not all of the depicted certificates 356, 358, 360 need be used, and other certificates such as a distribution-time certificate could also be used in addition to, or in place of any of the depicted certificates 356, 358, 360.

The MCA certificate 356 is preferably generated by the certifying authority, who may be an escrow agent, a bank, or in the case of the depicted embodiment, the vendor of the operating system 306. The generation of the MCA certificate 356 preferably occurs before the release and distribution of the privileged library 324 and the privileged utility set 326. Typically, only a single original MCA certificate 356 will exist, and the certifying authority certificate 336 distributed with the privileged utility set 326 will be a copy of the original MCA certificate 356.

The MCA certificate 356 preferably contains the certifying authority public key 338 of a certifying authority key pair 338, 334 and is self-signed with the certifying authority private key 334. Accordingly, the application 308 or other executable entities 304 containing the privileged utility set 326, and the corresponding certifying authority public key 338 included therein, are capable of authenticating the certifying authority certificate 336 with the certifying authority public key 338 in a manner which, as discussed above, does not involve the use of export-regulated cryptography.

The MRK certificate 358 is preferably generated at the time of release of the operating system 302 or of the privileged library 324 and privileged utility set 326. Consequently, a separate MRK certificate 358 may exist for each released version of the operating system 306 or privileged library 324/privileged utility set 326 modules. Thus, different versions of the privileged library 324 and privileged utility set 326 can be released for different geopolitical markets, different customers, and/or different applications/utilities developers.

Each different version of privileged utility set 326 may have a unique MRK certificate 358, and typically, be allotted access to differing levels of the privileged resources 368. The privileged library 324 or the privileged utility set 326 may then have a resource access data base such as a register, buffer, pointer, etc., that recognizes which version the privileged utility set 326 is and allots the privileged resources 368 or general resources 312 accordingly. In this manner, privileged utility sets 326 with access to less powerful cryptographic engines 50 may be released for certain geopolitical markets (e.g., foreign countries), and privileged utility sets 326 with access to more powerful cryptographic engines 50 may be released for other geopolitical markets (e.g., the United States).

The MRK certificate 358 preferably contains an MRK public key 362 corresponding to a MRK key pair 362, 363, and is signed with the certifying authority private key 334. The MRK private key 363 may be held by the privileged library 324 or within the privileged resource module 368. Holders of the certifying authority public key 338, such as the application 308 and other executable entities 304 having therein the privileged utility set 326, are capable of authenticating the MRK certificate 358 and obtaining the MRK public key 362 with the use of the certifying authority public key 338 that is held by the privileged library 324. Once again, this may be achieved without the use of export regulated cryptography.

The MRT certificate 360 is preferably generated by the privileged library 324 or by an Xengine 50 in response to a request by the privileged library 324, subsequent to the receipt of a challenge construct 350 from the application 308. The MRT certificate 360 preferably contains an MRT public key 364 of an MRT key pair 364, 365 and has a digital signature 366 authenticating the MRT public key 364 that is signed with an MRK private key 363. The MRT private key 365 is preferably stored with the use of a suitable data structure within the privileged library 324 or the privileged resource module 368. In the depicted embodiment, the MRT private key 365 is stored within the private key location 335.

Accordingly, a new MRT certificate 360 and corresponding MRT public key 364 are created at run-time during every initial authentication of the binding structure 310. Because possession of the MRT certificate 360 is required for access to the privileged resources 36, 46, 50, 52 within the privileged resource module 368, an additional level of security is attained thereby. Thus, in any attempt to substitute an interloping executable entity 304, 302 in place of the application 308 or the operating system 306, the interloping executable entity 304, 306 would require access to the properly signed MRT certificate 360, which certificate chain changes during every initial authentication and for every new release. Any such attempt would also require the properly signed certificate with certifying authority public key 338. Furthermore, any attempts to substitute the operating system 306 would require the proper private keys 334, 363, 365. Preferably, the private keys 334, 365 are never exposed in clear text, making it very difficult to identify and substitute the private keys 334, 363, 365.

Figure 12:
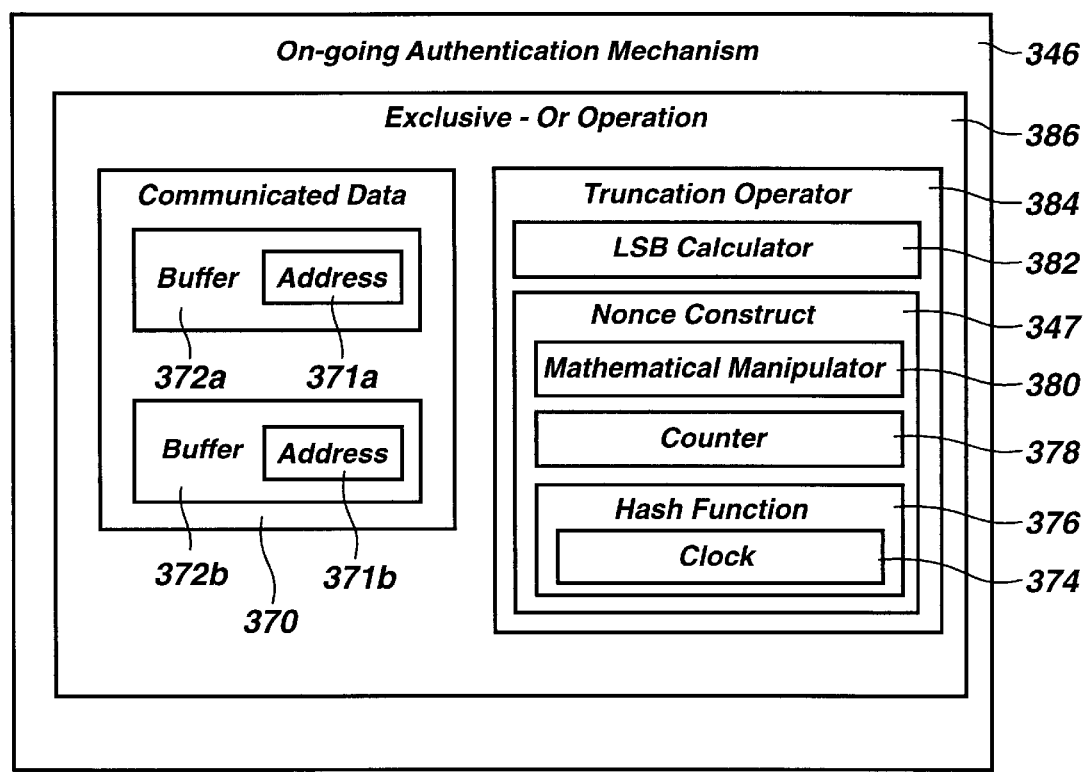
FIG. 12 is a schematic block diagram of an on-going authentication mechanism of the computer system of FIG. 10.

FIG. 12 shows the on-going authentication mechanism 346 of FIG. 10 in greater detail. In the depicted embodiment, the on-going authentication mechanism 346 comprises the nonce construct 347, in addition to a clock 374, a hash function 376, a counter 378, a mathematical manipulator 380, a least significant bit (LSB) calculator 382, and a truncation operation 384. Also included are communicated data 370, buffers 372 where the communicated data 370 is stored, and buffer addresses 371. A method of using the on-going authentication mechanism 346 for authentication purposes will be discussed in greater detail below.

Figure 13:
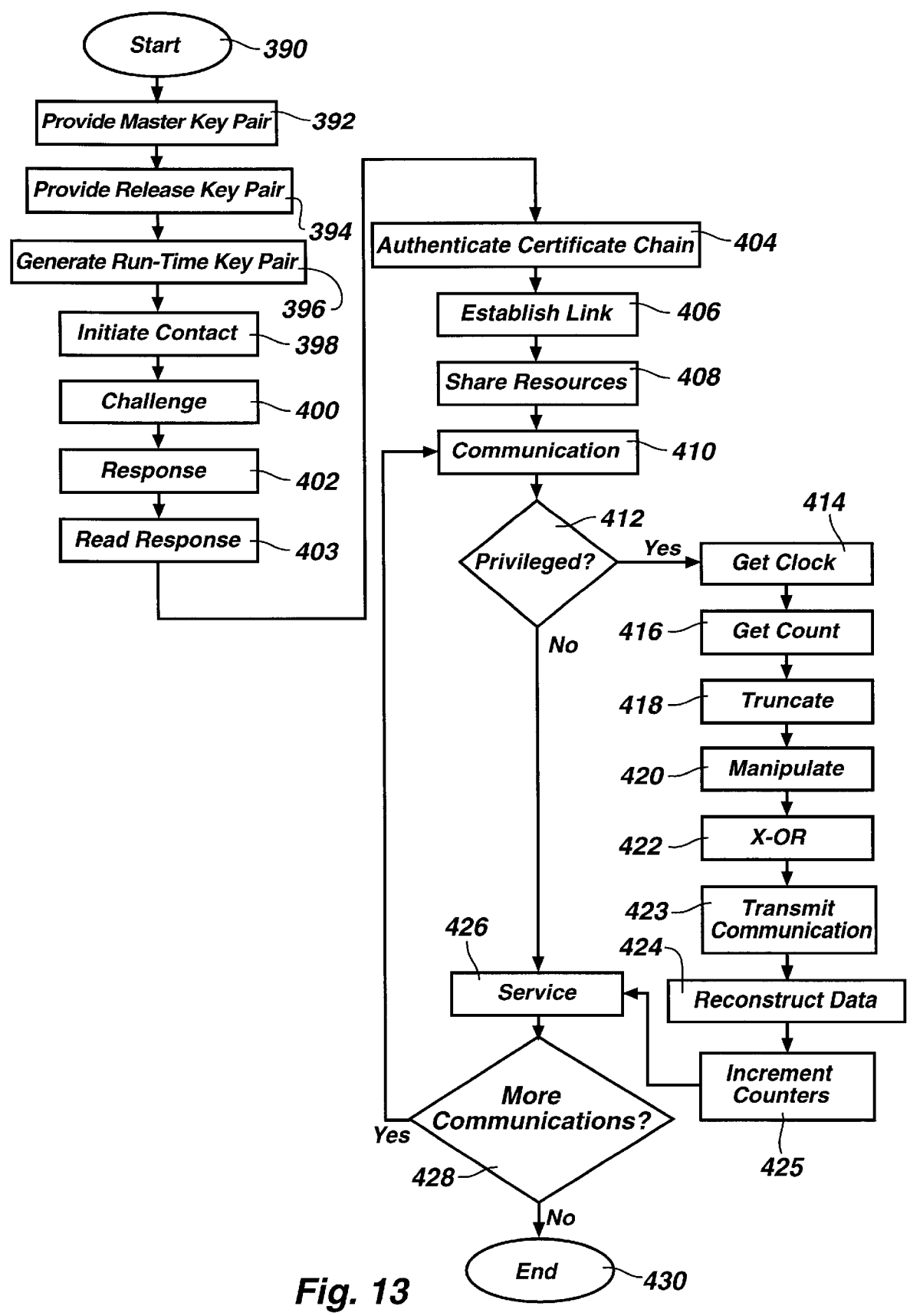
FIG. 13 is a schematic block diagram illustrating a process involving module authentication and binding library extensions of the present invention.

FIG. 13 is a block diagram illustrating one embodiment of a method of the present invention for authentication by one executable entity of the identity, origin, and integrity of another executable entity. The method of FIG. 13 is intended to be used in conjunction with the computer communication system 300 of FIGS. 10, 11 and 12.

The method of FIG. 13 begins with a start step 390. Typically, the method is employed and begins when a first executable entity 303, 304, 308 requires resources or communications to be shared from a second executable entity 301, 302, 306. At a provide master key pair step 392, a certifying authority public key 338 is provided and preferably placed within appropriate locations within the first executable entity 303, 304, 308 and the second executable entity 301, 302, 306.

In the depicted embodiments, the certifying authority public key 338 is provided within a certifying authority certificate 336 which is placed within a privileged utility set 326 that is preferably distributed as a software developer's kit as discussed above. The certifying authority private key is similarly located within a private key location within a privileged library 324 of a lower interface as discussed above.

In a provide release key pair step 392, the MRK key pair 362, 363 discussed above is generated in the stated manner. The MRK key pair are then provided within the initial authentication mechanism 332 as discussed above.

In a generate run-time key pair step 396, the privileged resources module 368 generates the run time key pair 364, 365.

In an initiate contact step 398, the authenticating entity 303, 304, 308 initiates contact with the authenticated entity 301, 302, 306. This may comprise a communication from the application 308 to the operating system 306 to detect the presence of the operating system 306, request communications or resources from the operating system 306, or some other form of preliminary contact.

In a challenge step 400, the application 308 generates a challenge construct 350 and transmits the challenge construct to the operating system 306.

In a response step 402, the operating system 306 receives the challenge construct, generates the nonce construct 344, and formulates a response construct 352 containing the challenge construct 350 and the nonce construct 344 and digitally signs the response construct 352 using the certifying authority private key 334, thereby wrapping, and possibly encrypting with some shared secret, by a method such as that proposed by Diffe-Hellman, the response construct 352. The operating system 306 then transmits the response construct 352 to the application 304.

In a read response construct step 403, the application 308 uses the certifying authority public key 338 to obtain the response construct and then, after decrypting, if necessary, verifies that the challenge construct 350 is the same challenge construct originally transmitted by the application 308. The application 308 also receives the nonce construct 344 for use in later on-going authentication.

In an authenticate certificate chain step 404, the operating system 306, after receiving the challenge construct 350, transmits the chain of certificates 358, 360 to the application 308. The certification authority certificate 356 may also be sent if not already held by the privileged utility set 326 The application subsequently validates each of the certificates 356, 358, 360 using the certifying authority public key 338 and the distribution-time public key 362 received in the MRK certificate.

In so doing, the privileged utility set 326 may authenticate the MCA certificate 356 using the certifying authority public key 338 as an initial authentication of the identity, origin, and integrity of the operating system. The privileged utility set 326 preferably uses the certifying authority public key 338 to authenticate the MRK certificate and obtain the MRK public key 362. Subsequently, using the MRK public key 362, the privileged utility set 326 validates the MRT certificate. The privileged utility set 326 then verifies that the certificates 356, 358, 360, contain the expected information listed above, possibly including a security attribute extension, and are consequently authentic, being of the expected identity, origin, and integrity.

In an establish link step 406, the general communication link 314 is established subject to the above-discussed initial authentication, and links or binds the application 308 to the operating system 306.

In a share resources step 408, general resources 312 are shared between the application 308 and the operating system 306 through the general communications link 314.

In a communication step 410, the application 308, intending further communications with the operating system 306, generates a communication to be transmitted to the operating system 306. The communication may be a general communication or a privileged communication. In one embodiment, general communications are allowed to be transmitted without further authentication, while privileged communications may require on-going authentication. Alternatively, all communications require on-going authentication.

Thus, for example, the application 308 could desire to encrypt or decrypt information with the use of the Xeng 50. Use of the Xeng 50 is determined at a "privileged?" query step 412 to be privileged communication involving privileged resources 368. If the communication is deemed not to be privileged, that is, to require or request privileged resources 368, the communication is serviced at a service step 426. If the communication is deemed to be privileged, or in the case of the embodiment where all communications require on-going authentication, the on-going authentication mechanism 346 is employed.

Thus, at a get clock step 414, the application 308, through the privileged utility set 326, notes the clock time that the communication was sent or requested. The privileged utility set 326 then uses a hash function 376 to hash the clock time. At a get counter step 416, the privileged utility set 326 notes the number of instances of privileged or general communications that have transpired between the application 308 and the operating system 306.

At a truncate step 418, the privileged utility set 326 combines the hashed clock time, the count, and the nonce construct 347, and using the mathematical manipulator 380, which may perform encryption, disguises the nonce construct 347, the count from the counter 378 and the clock time from the clock 374 by mathematically manipulating them together. The nonce construct 347 is truncated by the truncation operator 384 according to a least significant bit calculator 382. Subsequently, at an X-OR step 422, the privileged utility set 326 conducts an exclusive OR operation on the nonce construct 347 and the data, or preferably execution control data, of the communication being passed, effectively disguising the nonce construct 347 and the data from any interlopers or electronic eavesdroppers.

The privileged utility set 326 then transmits the disguised data through the privileged communication link 340 to the privileged library 324 in a transmit communication step 423. Immediately upon receipt of the disguised data, the privileged library 324 in a reconstruct data step notes the clock time and checks an internal counter 345b and uses the count to increment the operating system nonce construct copy 347b. At a reconstruct data step 424, the privileged library 324 uses the incremented nonce construct copy 347, the mathematical manipulator to decrypt if necessary, and the time to reconstruct the communicated data 370.

The counters 345a, 345b are updated in an increment counters step 425.

At a service step 426, the privileged library 324 responds to the communication 370. The privileged library 324 may similarly disguise its response as communicated data 370, but need not necessarily do so. In a preferred embodiment, the privileged library 324 simply transmits the return communication in plain text. In the given example, the return communication is encrypted or decrypted data. The privileged utility set 326 then awaits the next communication between the application 308 and the operating system 306. If a more communications query step 428 determines that a further communication 370 is required, the method returns to the communication step 410. If no more communications are forthcoming, the method of FIG. 13 ends at an end step 430.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus on a computer readable medium for effecting secure communications between executable entities in a computer system having a processor and a memory device operably connected thereto for storing executable data structures and operational data structures associated therewith, comprising:
   a first executable entity loadable by the processor to perform a first function, the first executable entity being provided with a first authentication module, the first authentication module holding a property uniquely identifying the first executable entity;
   a second executable entity loadable by the processor independent of the first executable entity to perform a second function and provided with a second authentication module, the second authentication module executable by a processor and adapted for communication with the first authentication module to verify the holding of the property by the first authentication module; and
   a binding module for establishing a communication link between the first and second executable entities in response to a verification by the second authentication module of the holding of the property by the first authentication module, and wherein the binding module includes a binding structure used for a non-authenticated communication link for access to non-authenticated resources and a privileged communication link for access to privileged resources.

2. The apparatus of claim 1, further comprising a privilege allocation module adapted to allow resources including cryptographic services to be shared between the first and second executable entities at least partially in response to the verification.

3. The apparatus of claim 1, wherein the first and second authentication modules are adapted for communications to authenticate an identity of the first executable entity to the second executable entity during each of a plurality of successive interactions between the first and second executable entities.

4. The apparatus of claim 3, wherein at least one of the first and second authentication modules is further adapted to combine a variable together by mathematical manipulation with information that is intended to be communicated between the first and second executable entities, to transmit the information and the variable between the first and second executable entities in an obfuscated manner.

5. The apparatus of claim 4, wherein the variable varies over time.

6. The apparatus of claim 4, wherein the variable is a state variable that varies in accordance with a number of successive interactions between the first and second executable entities.

7. The apparatus of claim 1, wherein:
   a. the second authentication module is adopted for the creation of a challenge construct that is passed from the second authentication module to the first authentication module and that contains a randomly generated property therein; and
   b. the first authentication modules is adapted for the response construct that is passed from the first authentication module to the second authentication module in response to the receipt of the challenge construct, the response construct including therein the challenge construct and a digital signature uniquely identifying the first executable entity to the second executable entity.

8. The apparatus of claim 1, further comprising a chain of certificates passed between the first and second authentication modules, and wherein the property uniquely identifying the second executable entity is contained within the chain of certificates.

9. The apparatus of claim 1, wherein:
   the second authentication module holds a property uniquely identifying the second executable entity; and
   the first authentication module is adapted for communication with the second authentication module to verify the holding of the property by the second authentication module.

10. The apparatus of claim 1, wherein the property uniquely identifying the first executable entity is incorporated within the first authentication module in an obfuscated form.

11. A method for effecting secure communications between executable entities in a computer system having a memory and a processor, comprising:
   providing a first executable entity executable by the processor to perform a first function and holding a property capable of uniquely identifying the first executable entity;
   providing a second executable entity, executable by the processor to perform a second function;
   communicating a request for authentication from the second executable entity to the first executable entity;
   communicating the holding of the property from the first executable entity to the second executable entity in response to the request for authentication;
   authenticating the first executable entity to the second executable entity by the second authenticating module verifying the holding of the property by the first executable entity; and
   forming a binding between the first and second executable entities at least partially in response to authenticating the first executable entity to the second executable entity, the binding enabling further communication between the first and second executable entities, and wherein the binding is adapted to identify general non-authenticated communication for access to non-authenticated resources and privilege communication for access to privilege communication.

12. The method of claim 11, further comprising authenticating the first executable entity to the second executable entity during each of a plurality of successive interactions between the first and second executable entities.

13. The method of claim 12, wherein authenticating the first executable entity to the second executable entity during each of a plurality of successive interactions further comprises:
   passing a variable between the first and second executable entities during an initial interaction of the first and second executable entities; and
   allowing the dynamic relational binding to continue to exist subject to the second executable entity verifying a proper state of the variable during each of the plurality of successive interactions between the first and second executable entities.

14. The method of claim 13, wherein the state of the variable varies according to a number of occurrences of the successive interactions between the first and second executable entities.

15. The method of claim 11, wherein authenticating the first executable entity to the second executable entity further comprises:

passing a challenge construct from the second executable entity to the first executable entity; and passing a response construct from the first executable entity to the second executable entity, the response construct comprising the challenge construct and a digital signature.

16. The method of claim 11, wherein authenticating the first executable entity to the second executable entity comprises passing a chain of public keys from the first executable entity to the second executable entity.

17. The method of claim 11, further comprising sharing cryptographic services between the first and second executable entities only after authenticating the first executable entity to the second executable entity.

18. The method of claim 11, further comprising authenticating the second executable entity to the first executable entity by recognizing by the first executable entity a property uniquely identifying the second executable entity.

19. The method of claim 18, further comprising authenticating of the second executable entity to the first executable entity during each of a plurality of successive interactions between the first and second executable entities.

20. A computer memory storing therein computer instructions capable of creating within a processor executable data structures and operational data structures associated therewith, the executable and operational data structures comprising:

a first executable entity adapted to perform a first function within the processor;

a second executable entity adapted to perform a second function within the processor;

a resource allocation module associated with the first executable entity adapted to allow a resource to be shared between the second executable entities only after an authentication of the first executable entity by the second executable entity; and an on-going authentication mechanism adapted to authenticate the first executable to the second executable entity during each of a plurality of successive interactions between the first and second executable entities, and wherein the on-going authentication mechanism maintains a state associated with each of the plurality of successive interactions.

* * * * *

UNITED STATES PATENT AND TRADEMARK OFFICE
CERTIFICATE OF CORRECTION

PATENT NO.     : 6,615,350 B1
DATED          : September 2, 2003
INVENTOR(S)    : Roger R. Schell, Mark G. Gayman and Robert R. Jueneman It is certified that error appears in the above-identified patent and that said Letters Patent is hereby corrected as shown below:

<u>Column 40,</u>
Line 48, delete "general" after "identify".

Signed and Sealed this

Twenty-third Day of December, 2003

JAMES E. ROGAN
*Director of the United States Patent and Trademark Office*